US011343696B2

(12) United States Patent
Segev et al.

(10) Patent No.: US 11,343,696 B2
(45) Date of Patent: May 24, 2022

(54) APPARATUS, SYSTEM AND METHOD OF RANGING MEASUREMENT WITH SECURE LONG TRAINING FIELD (LTF)

(71) Applicant: INTEL CORPORATION, Santa Clara, CA (US)

(72) Inventors: Jonathan Segev, Tel Mond (IL); Benny Abramovsky, Petah Tikva (IL); Qinghua Li, San Ramon, CA (US); Chittabrata Ghosh, Fremont, CA (US); Feng Jiang, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 111 days.

(21) Appl. No.: 16/487,986

(22) PCT Filed: Sep. 27, 2017

(86) PCT No.: PCT/US2017/053619
§ 371 (c)(1),
(2) Date: Aug. 22, 2019

(87) PCT Pub. No.: WO2018/160223
PCT Pub. Date: Sep. 7, 2018

(65) Prior Publication Data
US 2020/0029236 A1    Jan. 23, 2020

Related U.S. Application Data

(60) Provisional application No. 62/464,687, filed on Feb. 28, 2017.

(51) Int. Cl.
*H04W 24/10* (2009.01)
*G01S 13/82* (2006.01)
(Continued)

(52) U.S. Cl.
CPC .......... *H04W 24/10* (2013.01); *G01S 13/825* (2013.01); *H04L 25/0226* (2013.01);
(Continued)

(58) Field of Classification Search
CPC .............. H04W 24/10; H04W 72/042; H04W 72/0446; H04W 88/06; H04W 88/08;
(Continued)

(56) References Cited

U.S. PATENT DOCUMENTS

2004/0248515 A1* 12/2004 Molev Shteiman ......................... H04B 1/71057
455/63.1
2006/0291656 A1* 12/2006 Dalmases ........... H04L 27/2613
380/268
(Continued)

OTHER PUBLICATIONS

International Search Report and the Written Opinion for International Application No. PCT/US2017/053619, dated Jan. 29, 2018, 17 pages.
(Continued)

*Primary Examiner* — Nishant Divecha
(74) *Attorney, Agent, or Firm* — Shichrur & Co.

(57) ABSTRACT

Some demonstrative embodiments include apparatuses, systems and/or methods of Multi-User (MU) ranging measurement. For example, an apparatus may include circuitry and logic configured to cause a wireless station to generate a plurality of sounding sequences corresponding to a plurality of stations (STAs), the plurality of sounding sequences including at least first and second different sounding sequences, the first sounding sequence corresponding to at least one first STA of the plurality of STAs, the second sounding sequence corresponding to at least one second STA of the plurality of STAs; during a Multi-User (MU) ranging measurement, to transmit a MU frame to indicate a MU Downlink (DL) transmission; and, following the MU
(Continued)

frame, to transmit a MU DL Null Data Packet (NDP) transmission to the plurality of STAs, the MU DL NDP transmission including a plurality of Long Training Fields (LTFs) including the plurality of sounding sequences.

16 Claims, 9 Drawing Sheets

(51) Int. Cl.
*H04L 25/02* (2006.01)
*H04W 88/08* (2009.01)
*H04W 72/04* (2009.01)
*H04W 88/06* (2009.01)

(52) U.S. Cl.
CPC ..... *H04W 72/042* (2013.01); *H04W 72/0446* (2013.01); *H04W 88/06* (2013.01); *H04W 88/08* (2013.01)

(58) Field of Classification Search
CPC ..... H04W 84/12; H04W 64/00; G01S 13/825; G01S 13/74; H04L 25/0226; H04L 5/0051; H04L 5/0037; H04L 27/2613
See application file for complete search history.

(56) References Cited

U.S. PATENT DOCUMENTS

| | | |
|---|---|---|
| 2011/0075607 A1 | 3/2011 | Kim et al. |
| 2013/0094488 A1 | 4/2013 | Choi et al. |
| 2014/0098701 A1 | 4/2014 | Sohn et al. |
| 2014/0362840 A1* | 12/2014 | Wong .................... H04W 72/12 370/338 |
| 2015/0156794 A1* | 6/2015 | Kwon ................. H04L 25/0224 370/329 |
| 2015/0222346 A1 | 8/2015 | Garrett et al. |
| 2016/0359653 A1* | 12/2016 | Lee ..................... H04W 74/085 |
| 2016/0366548 A1 | 12/2016 | Wang et al. |
| 2017/0033898 A1* | 2/2017 | Chun ................... H04B 7/0452 |
| 2018/0011179 A1* | 1/2018 | Zhang .................... H04L 69/22 |
| 2019/0182793 A1* | 6/2019 | Wang ...................... H04B 7/06 |

OTHER PUBLICATIONS

IEEE Std 802.11™-2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.
International Preliminary Report on Patentability for International Application No. PCT/US2017/053619, dated Sep. 12, 2019, 13 pages.

* cited by examiner

APPARATUS, SYSTEM AND METHOD OF RANGING MEASUREMENT WITH SECURE LONG TRAINING FIELD (LTF)

CROSS REFERENCE

This Application claims the benefit of and priority from U.S. Provisional Patent Application No. 62/464,687 entitled "APPARATUS, SYSTEM AND METHOD OF PROTECTED MULTI USER MEASUREMENT", filed Feb. 28, 2017, the entire disclosure of which is incorporated herein by reference.

TECHNICAL FIELD

Embodiments described herein generally relate to Multi User (MU) ranging measurement.

BACKGROUND

Outdoor navigation is widely deployed thanks to the development of various global-navigation-satellite-systems (GNSS), e.g., Global Positioning System (GPS), GALILEO, and the like.

Recently, there has been a lot of focus on indoor navigation. This field differs from the outdoor navigation, since the indoor environment does not enable the reception of signals from GNSS satellites. As a result, a lot of effort is being directed towards solving the indoor navigation problem.

A Fine Timing Measurement (FTM) Protocol, e.g., in accordance with an IEEE 802.11-2016 Specification, may include measuring a Round Trip Time (RTT) from a wireless station (STA) to a plurality of other STAs, e.g., several Access Point (AP) STAs and/or non-AP STAs, for example, to perform trilateration and/or calculate the location of the STA.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
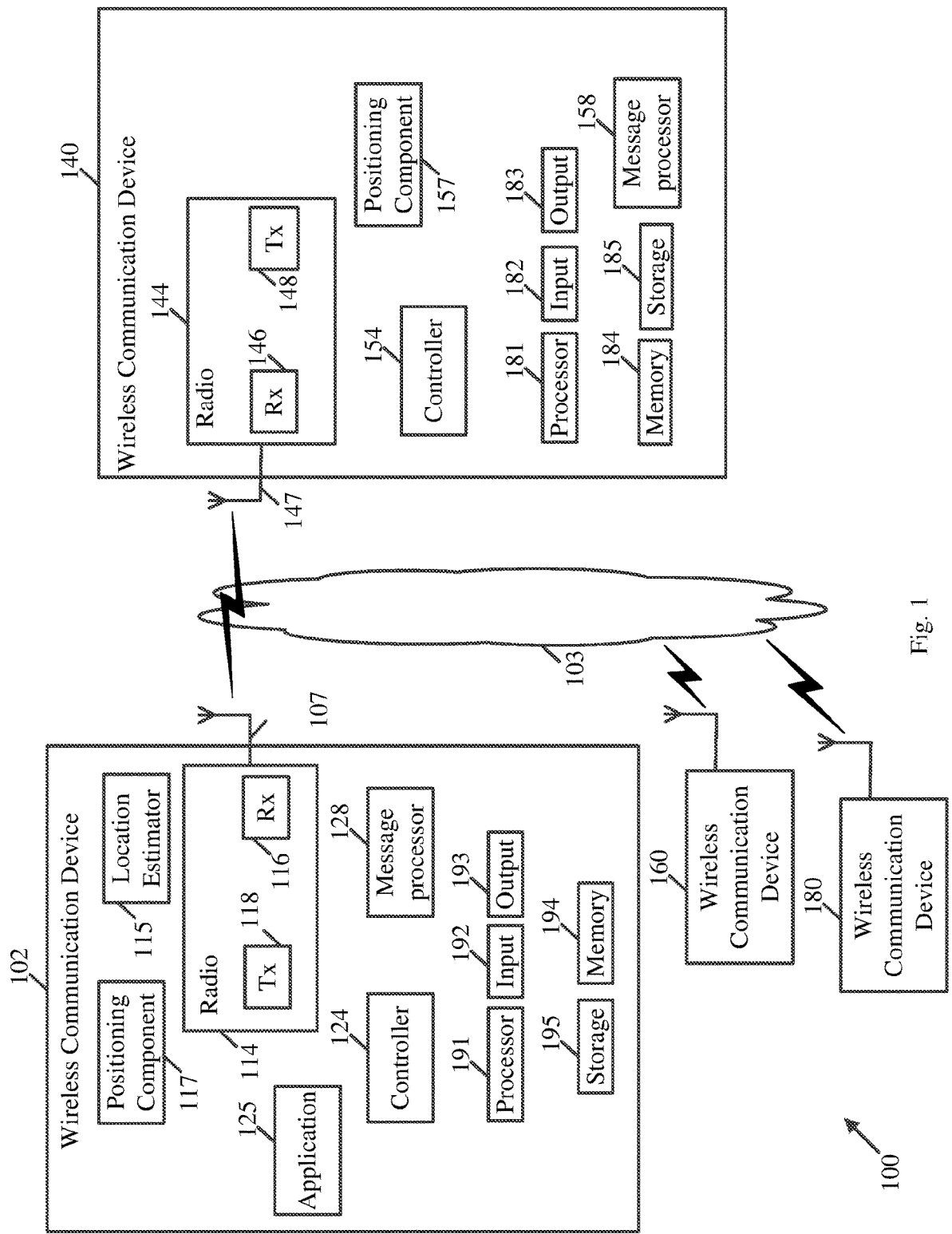
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2016 (IEEE 802.11-2016, IEEE Standard for Information technology—Telecommunications and information exchange between systems Local and metropolitan area networks—Specific requirements, Part 11: Wireless LAN Medium Access Control (MAC) and Physical Layer (PHY) Specifications, Dec. 7, 2016); IEEE 802.11ax (IEEE 802.11ax, High Efficiency WLAN (HEW)); and/or IEEE 802.11az (IEEE 802.11az, Next Generation Positioning)) and/or future versions and/or derivatives thereof, devices and/or networks operating in accordance with existing WiFi Alliance (WFA) Specifications (including Wi-Fi Neighbor Awareness Networking (NAN) Technical Specification, Version 1.0, May 1, 2015) and/or future versions and/or derivatives thereof, devices and/or networks operating in accordance with existing WFA Peer-to-Peer (P2P) specifications (including WiFi P2P technical specification, version 1.5, August 2014) and/or future versions and/or derivatives thereof, devices and/or networks operating in accordance with existing Wireless-Gigabit-Alliance (WGA) specifications (including Wireless Gigabit Alliance, Inc WiGig MAC and PHY Specification Version 1.1, April 2011, Final specification) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 or 5 Gigahertz (GHz). However, other embodiments may be implemented utilizing any other suitable wireless communication frequency bands, for example, a 60 GHz band, a millimeterWave (mmWave) frequency band, a Sub 1 GHz (S1G) frequency band, a WLAN frequency band, a WPAN frequency band, and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a Quality of Service (QoS) basic service set (BSS), a tunneled direct-link setup (TDLS) link, a STA-to-STA communication in an independent basic service set (IBSS), or the like.

Some demonstrative embodiments are described herein with respect to WiFi communication. However, other embodiments may be implemented with respect to any other communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102, 140, 160 and/or 180.

In some demonstrative embodiments, wireless communication devices 102, 140, 160 and/or 180 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, an Internet of Things (IoT) device, a sensor device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, devices 102, 140, 160 and/or 180 may include, operate as, and/or perform the functionality of one or more STAs. For example, device 102 may include at least one STA, and/or device 140 may include at least one STA.

In some demonstrative embodiments, devices 102, 140, 160 and/or 180 may include, operate as, and/or perform one or more functionalities of one or more WLAN STAs.

In some demonstrative embodiments, devices 102, 140, 160 and/or 180 may include, operate as, and/or perform one or more functionalities of one or more Wi-Fi STAs.

In some demonstrative embodiments, devices 102, 140, 160 and/or 180 may include, operate as, and/or perform one or more functionalities of one or more BT devices.

In some demonstrative embodiments, devices 102, 140, 160 and/or 180 may include, operate as, and/or perform one or more functionalities of one or more Neighbor Awareness Networking (NAN) STAs.

In some demonstrative embodiments, one of wireless communication devices 102, 140, 160 and/or 180, e.g., device 140, may include, operate as, and/or perform one or more functionalities of an AP STA, and/or one or more of wireless communication devices 102, 140, 160 and/or 180, e.g., device 102, 160 and/or 180, may include, operate as, and/or perform one or more functionalities of a non-AP STA. In other embodiments, devices 102, 140, 160 and/or 180 may operate as and/or perform the functionality of any other STA.

For example, the AP may include a router, a PC, a server, a Hot-Spot and/or the like.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-access-point (non-AP) station (STA) may include a STA that is not contained within an AP. The non-AP STA may perform any other additional or alternative functionality.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102, 140, 160 and/or 180 may optionally include other suitable hardware components and/or software components. In some demonstrative embodiments, some or all of the components of one or more of devices 102, 140, 160 and/or 180 may be enclosed in a common housing or packaging, and may be interconnected or operably associated using one or more wired or wireless links. In other embodiments, components of one or more of devices 102, 140, 160 and/or 180 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102, 140, 160 and/or 180 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a WiFi channel, an IR channel, a Bluetooth (BT) channel, and the like.

In some demonstrative embodiments, wireless communication medium 103 may include a wireless communication channel over a 2.4 Gigahertz (GHz) frequency band, or a 5 GHz frequency band, a millimeterWave (mmWave) frequency band, e.g., a 60 GHz frequency band, a S1G band, and/or any other frequency band.

In some demonstrative embodiments, devices 102, 140, 160 and/or 180 may include one or more radios including circuitry and/or logic to perform wireless communication between devices 102, 140, 160, 180 and/or one or more other wireless communication devices. For example, device 102 may include a radio 114, and/or device 140 may include a radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a 2.4 GHz band, a 5 GHz band, an mmWave band, a S1G band, and/or any other band.

In some demonstrative embodiments, radios 114 and/or 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, 160, 180 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140, 160, 180 and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, at least part of the functionality of controller 124 may be implemented as part of one or more elements of radio 114, and/or at least part of the functionality of controller 154 may be implemented as part of one or more elements of radio 144.

In other embodiments, the functionality of controller 124 may be implemented as part of any other element of device 102, and/or the functionality of controller 154 may be implemented as part of any other element of device 140.

In some demonstrative embodiments, device 102 may include a message processor 128 configured to generate, process and/or access one or more messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or more messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include, or may be implemented, partially or entirely, by circuitry and/or logic, e.g., one or more processors including circuitry and/or logic, memory circuitry and/or logic, MAC circuitry and/or logic, PHY circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, device 102, device 140, device 160 and/or device 180 may include, operate as, perform the role of, and/or perform one or more functionalities of, one or more STAs. For example, device 102 may include at least one STA, device 140 may include at least one STA, device 160 may include at least one STA, and/or device 180 may include at least one STA.

In some demonstrative embodiments, wireless communication devices 102, 140, 160, and/or 180 may form, or may communicate as part of, a wireless local area network (WLAN).

In some demonstrative embodiments, wireless communication devices 102, 140, 160, and/or 180 may form, or may communicate as part of, a WiFi network.

In other embodiments, wireless communication devices 102, 140, 160, and/or 180 may form, and/or communicate as part of, any other additional or alternative network.

In some demonstrative embodiments, devices 102, 140, 160 and or 180 may be configured to perform a MU positioning ("ranging") measurement, e.g., as described below.

In some demonstrative embodiments, device 140 may be configured to perform a MU positioning measurement with devices 102, 160, and/or 180, e.g. as described below.

In some demonstrative embodiments, device 140 may include an AP and/or a responder to perform the MU positioning measurement with devices 102, 160, and/or 180, e.g. as described below.

In some demonstrative embodiments, devices 102, 160, and/or 180 may include one or more applications configured to provide and/or to use one or more location based services, e.g., a social application, a navigation application, a location based advertising application, and/or the like. For example, device 102 may include an application 125 to be executed by device 102.

In some demonstrative embodiments, application 125 may use range information between devices 102 and 140, for example, to determine an estimated location of device 102, e.g., with respect to a coordinate system, e.g., a World Geodetic System 1984 (WGS84), and/or a local coordinate system.

In one example, device 102 may include a Smartphone and device 140 may include an AP, which is located in a shop, e.g., in a shopping mall. According to this example, application 125 may use the range information to determine a relative location of device 102 with respect to device 140, for example, to receive sale offers from the shop.

In another example, device 102 may include a mobile device and device 140 may include a responder station, which is located in a parking zone, e.g., of a shopping mall. According to this example, application 125 may use the range information to determine a location of device 102 in the parking zone, for example, to enable a user of device 102 to find a parking area in the parking zone.

In some demonstrative embodiments, device 102 may include a location estimator 115 configured to perform one or more positioning measurements to be used to estimate a location of device 102, e.g., as described below.

In some demonstrative embodiments, location estimator 115 may be configured to determine a location of device 102, for example, using a plurality of ranges from the plurality of other STAs, e.g., by performing trilateration.

In some demonstrative embodiments, location estimator 115 may include circuitry and/or logic, e.g., processor circuitry and/or logic, memory circuitry and/or logic, and/or any other circuitry and/or logic, configured to perform the functionality of location estimator 115. Additionally or alternatively, one or more functionalities of location estimator 115 may be implemented by logic, which may be executed by a machine and/or one or more processors, e.g., as described below.

In some demonstrative embodiments, at least part of the functionality of location estimator 115 may be implemented as part of controller 124.

In other embodiments, the functionality of location estimator 115 may be implemented as part of any other element of device 102.

In some demonstrative embodiments, location estimator 115 may be configured to estimate the location of device 102, for example, based on time based range measurements, for example, with device 140 and/or one or more other devices.

In some demonstrative embodiments, the time based range measurements may be performed using WLAN communications, e.g., WiFi. For example, using WiFi to perform the time based range measurements may enable, for example, increasing an indoor location accuracy of the location estimation of device 102, e.g., in an indoor environment.

In some demonstrative embodiments, the time based range measurements may include a round trip time (RTT) measurement (also referred to as Time of Flight (ToF) procedure).

In some demonstrative embodiments, a ToF value may be defined as the overall time a signal propagates from a first station, e.g., device 102, to a second station, e.g., device 140, and back to the first station. A distance between the first and second stations may be determined based on the ToF value, for example, by dividing the ToF value by two and multiplying the result by the speed of light.

In some demonstrative embodiments, the ToF measurement procedure may include a Fine Timing Measurement (FTM) procedure.

In some demonstrative embodiments, the ToF measurement procedure may include any other positioning measurement.

In some demonstrative embodiments, devices 102, 140, 160, and/or 180 may be configured to perform one or more FTM measurements, ToF measurements, positioning measurements and/or communications, ranging measurements and/or communications, proximity measurements and/or communications, location estimation measurements and/or communications.

In some demonstrative embodiments, devices 102, 140, 160, and/or 180 may be configured to perform any other additional or alternative positioning measurements and/or communications, ranging measurements and/or communications, proximity measurements and/or communications, location estimation measurements and/or communications, for example, and/or according to any other additional or alternative procedure and/or protocol, e.g., an Received Signal Strength Indication (RSSI) procedure.

Some demonstrative embodiments are described below with respect to FTM measurements according to an FTM procedure. However, other embodiments may be implemented with respect to any other additional or alternative positioning measurements and/or communications, ranging measurements and/or communications, proximity measurements and/or communications, location estimation measurements and/or communications.

In some demonstrative embodiments, devices 102, 140, 160, and/or 180 may be configured to perform one or more FTM measurements, for example, using WLAN communications, e.g., WiFi. For example, using WiFi to perform time based range measurements, e.g., FTM measurements, may enable, for example, increasing an indoor location accuracy of the mobile devices, e.g., in an indoor environment.

In some demonstrative embodiments, devices 102, 160, and/or 180 may perform the functionality of an initiator device, and device 140 may perform the functionality of a responder device. For example, device 140 may include an AP or a non-AP STA, and/or devices 102, 160, and/or 180 may include a non-AP STA, for example, a mobile device, e.g., a Smartphone, which may perform the FTM protocol with the AP, for example, to determine a location of the mobile device.

In some demonstrative embodiments, device 102 may include a positioning component 117, and/or device 140 may include a positioning component 157, which may be configured to perform one or more positioning measurements, operations and/or communications, e.g., as described below.

In some demonstrative embodiments, positioning components 117 and/or 157 may be configured to perform one or more operations and/or communications of FTM measurements. In other embodiments, positioning components 117 and/or 157 may be configured to perform one or more operations and/or communications of any other positioning measurement.

In some demonstrative embodiments, positioning components 117 and/or 157 may include, or may be implemented, using suitable circuitry and/or logic, e.g., controller circuitry and/or logic, processor circuitry and/or logic, memory circuitry and/or logic, and/or any other circuitry and/or logic, which may be configured to perform at least part of the functionality of positioning components 117 and/or 157. Additionally or alternatively, one or more functionalities of positioning components 117 and/or 157 may be implemented by logic, which may be executed by a machine and/or one or more processors, e.g., as described below.

In some demonstrative embodiments, positioning component 117 may be configured to perform one or more operations of, and/or at least part of the functionality of, message processor 128 and/or controller 124, for example, to trigger communication of one or more FTM messages and/or positioning packets, for example, sounding signals and/or Non-Data Packets (NDPs), e.g., as described below.

In some demonstrative embodiments, positioning component 157 may be configured to perform one or more operations of, and/or at least part of the functionality of, message processor 158 and/or controller 154, for example, to trigger communication of one or more FTM messages and/or positioning packets, for example, sounding signals and/or NDPs, e.g., as described below.

In some demonstrative embodiments, positioning components 117 and/or 157 may be configured to trigger the FTM measurements, for example, periodically and/or or upon a request from an application executed by a device, for example, to determine an accurate location of the device.

In some demonstrative embodiments, positioning components 117 and/or 157 may be configured to perform one or more measurements according to the FTM protocol, e.g., as described below.

In some demonstrative embodiments, positioning components 117 and/or 157 may be configured to perform one or more proximity, ranging, and/or location estimation measurements, e.g., in an indoor location, based on the FTM measurements. For example, the FTM measurements may provide a relatively accurate estimation of location, range and/or proximity, e.g., in an indoor location.

Some demonstrative embodiments are described herein with respect to a positioning component, e.g., positioning components 117 and/or 157, configured to perform measurements according to an FTM protocol and/or procedure. However, in other embodiments, the FTM component may be configured to perform any other additional or alternative type of Time of Flight (ToF) measurements, ranging measurements, positioning measurements, proximity measurements, and/or location estimation measurements, e.g., according to any additional or alternative protocol and/or procedure.

In some demonstrative embodiments, devices 102, 140, 160, and/or 180 may be configured to utilize the FTM Protocol. For example, device 102 may be configured to use the FTM protocol to measure the RTT from a STA implemented by device 102 to a plurality of other STAs, e.g., including device 140, for example, including one or more AP STAs and/or non-AP STAs.

In some demonstrative embodiments, the FTM protocol may be implemented as part of a Specification or protocol, for example, an IEEE 802.11 Specification, for example, by a task group dealing with WiFi positioning, e.g., IEEE 802.11az—Next Generation positioning.

In some demonstrative embodiments, the FTM protocol may be configured to enable providing, for example, at least improved capacity, support of high density environments, improved scalability, improved accuracy, and/or one or more additional or alternative advantages, and/or benefits.

In some demonstrative embodiments, devices 102, 140, 160, and/or 180 may be configured to utilize a MU ranging Protocol, measurement, and/or procedure, e.g. as described below.

In some demonstrative embodiments, devices 102, 140, 160, and/or 180 may be configured to use channel sounding, for example, for WiFi ranging, e.g., according to a MU ranging Protocol, and/or in accordance with an IEEE 802.11 Specification, e.g., an IEEE 802.11-2016, and/or IEEE 802.11az specification. For example, devices 102, 140, 160, and/or 180 may be configured to use one or more sounding signals, messages, packets or frames as part of a ranging measurement, e.g., according to a MU ranging Protocol.

In some demonstrative embodiments, an unintended and/or an unwanted device, for example, an eavesdropper, may attempt to overhear the sounding signals, for example, for malicious attacks.

Some demonstrative embodiments may be configured, for example, at least to allow solving a technical problem, for example, of how to protect the sounding signals, for example, to improve privacy and/or security of WiFi ranging and/or positioning.

In some demonstrative embodiments, protection of a sounding signal may be achieved, for example, by protection of one or more sounding symbols, for example, including at least one or more High Efficiency (HE) Long Training Field (LTF) (HE-LTF) symbols, e.g., in accordance with an IEEE 802.11ax communication scheme, and/or a Very High Throughput (VHT) LTF (VHT-LTF), e.g., in accordance with an IEEE 802.11ac communication scheme.

For example, the one or more sounding symbols may be protected, for example, to prevent an eavesdropper, e.g., an adversary, from being able to estimate one or more timing measurements, for example, a Time of Arrival (TOA) and/or a differential Time of Arrival (DTOA), e.g., based on the sounding symbols, and/or to prevent the eavesdropper from transmitting a spoofing signal, which may create a wrong sense of distance at a device, which may receive the spoofing signal.

For example, using a shared measurement signal for a Downlink (DL) part of an RTT measurement (DL NDP) of a MU measurement procedure may allow protection of measurements from an adversary, e.g., as long as the adversary is not part of a MU group interacting in the MU communication. However, there may be a technical problem, for example, in case the adversary is part of the MU group, as the adversary may be aware of the shared DL NDP training signal sequence, and, therefore, may be able to spoof the shared DL NDP training signal sequence, e.g., by transmitting a spoofed signal over the shared measurement signal.

In one example, an Uplink (UL) NDP may be private but, at minimum, all other STAs taking part in the MU group may be aware of the shared DL NDP training signal sequence, for example, in order to be able to estimate a TOA properly. Therefore, if the adversary is part of the MU group, the adversary may be able to spoof remaining STAs of the MU group, for example, by transmitting a spoofed or falsified DL NDP frame to give a wrong sense of distance to the remaining STAs, e.g., even if the UL NDP may be private.

Figure 2:
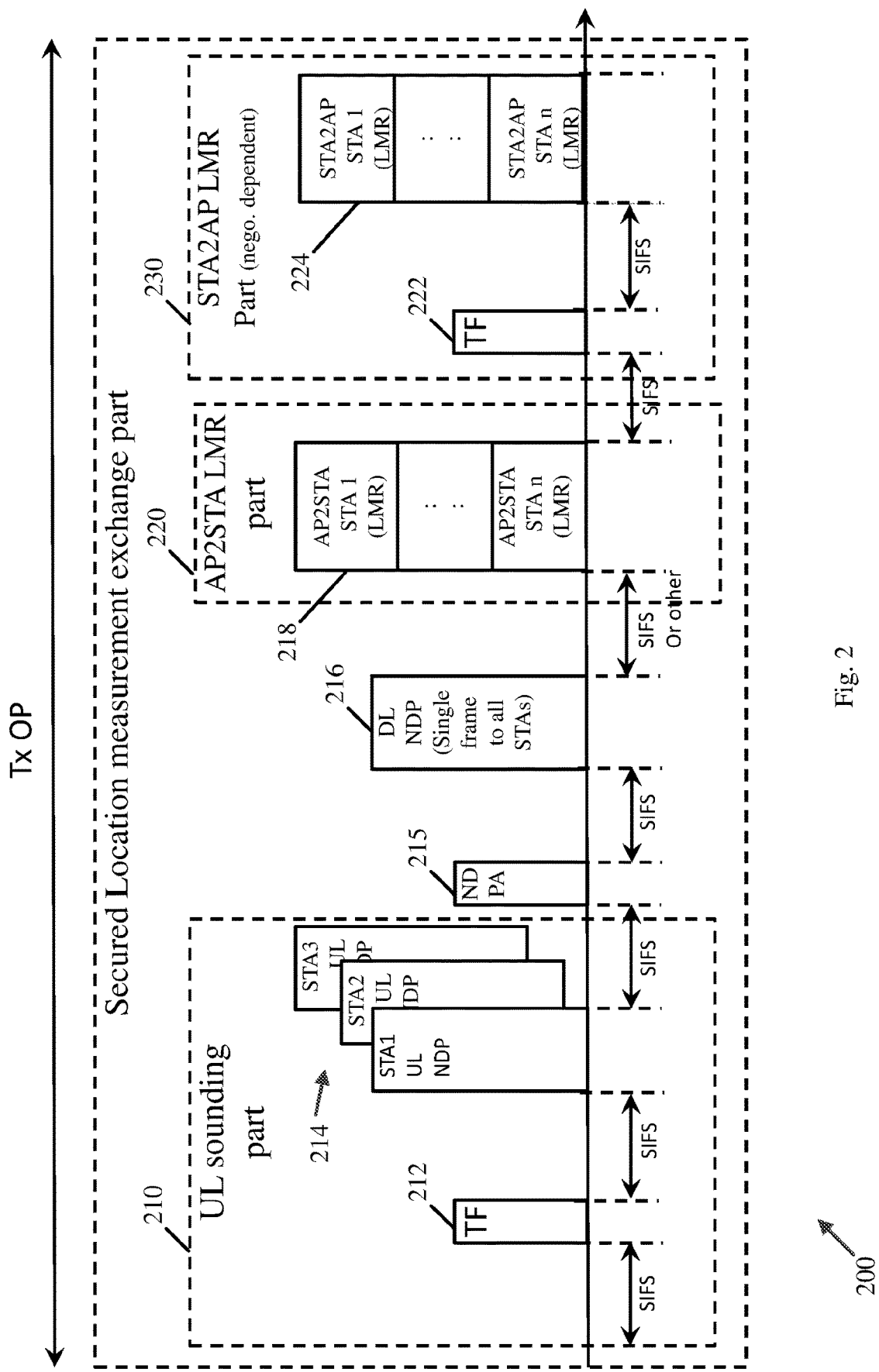
FIG. 2 is a schematic illustration of a Multi User (MU) ranging measurement procedure to demonstrate a technical problem, which may be solved in accordance with some demonstrative embodiments.

Reference is made to FIG. 2, which schematically illustrates a MU ranging measurement procedure 200 to demonstrate a technical problem, which may be solved in accordance with some demonstrative embodiments.

In one example, one or more operations of MU positioning measurement procedure 200 may be implemented in accordance with a future IEEE 802.11az Specification.

In one example, an AP, e.g., device 140 (FIG. 1), may perform MU ranging measurement procedure 200 with a plurality of stations, e.g., including devices 102, 160 and/or 180 (FIG. 1), for example, to perform a MU positioning measurement between the AP and the plurality of stations.

As shown in FIG. 2, MU positioning measurement procedure 200 may include an UL sounding part 210, during which the AP may transmit a trigger frame (TF) 212 to the plurality of stations, for example, to trigger a MU ranging measurement.

As shown in FIG. 2, the plurality of stations may transmit a plurality of UL sounding transmissions 214 to the AP, for example, as part of a MU uplink transmission, e.g., simultaneously, for example, during UL sounding part 210.

In one example, the plurality of UL sounding transmissions 214 may include a plurality of NDPs, e.g., from respective ones of the plurality of stations.

As shown in FIG. 2, the AP may transmit a frame 215 to the plurality of stations, for example, to indicate a shared DL NDP frame 216 to be transmitted to the plurality of stations.

In one example, frame 215 may include an NDP Announcement (NDPA) to announce the shared DL NDP frame 216.

In another example, frame 215 may include a trigger frame to trigger the shared DL NDP frame 216.

As shown in FIG. 2, the AP may transmit the shared DL NDP frame 216 to the plurality of stations, for example, in the form of a MU NDP.

As shown in FIG. 2, as shown in FIG. 2, MU ranging measurement procedure 200 may include an AP to STA Location Management Report (LMR) (AP2STLMR) part 220, during which the AP may transmit a MU LMR 218 to the plurality of stations, for example, in the form of a MU downlink transmission. For example, LMR 218 may include, for a station, one or more ranging measurements between the AP and the STA, e.g., based on an UL sounding transmission 214 from the STA and/or the shared DL NDP frame 216.

In some demonstrative embodiments, the plurality of stations may be configured to determine one or more ranging parameters, for example, based on LMR 218, MU sounding transmission 216, and/or the plurality of sounding transmissions 214.

As shown in FIG. 2, MU ranging measurement procedure 200 may include a STA to AP LMR (STA2APLMR) part 230, during which the AP may transmit a TF 222 to the plurality of stations, for example, to trigger a plurality of LMRs from the plurality of stations.

As shown in FIG. 2, the plurality of stations may transmit a plurality of LMRs 224 to the AP, for example, as part of a MU uplink transmission, e.g., simultaneously.

In some demonstrative embodiments, the AP may be configured to determine one or more ranging parameters with respect to the plurality of stations and/or to the AP, for example, based on LMRs 224.

As shown in FIG. 2, for example, using shared DL NDP frame 216 may not provide sufficient protection of MU ranging measurement procedure 200 from a spoofing adversary, e.g., if the adversary is part of the plurality of STAs interacting in the MU communication with the AP. For example, the adversary may be aware of shared DL NDP frame 216, e.g., based on frame 215, and, therefore, may be able to spoof shared DL NDP frame 216, for example, by transmitting a spoofed DL NDP frame over DL NDP frame 216.

In one example, although UL NDPs 214 may be private, the STAs taking part in the MU group may be aware of the shared DL NDP 216, for example, in order to be able to estimate a TOA properly. Therefore, if the adversary is part of the MU group, the adversary may be able to spoof remaining STAs of the MU group, for example, by transmitting a spoofed or falsified DL NDP frame to give a wrong sense of distance to the remaining STAs, e.g., even if the UL NDPs 214 may be private.

Referring back to FIG. 1, in some demonstrative embodiments, devices 102, 140, 160, and/or 180 may be configured to communicate according to a MU protocol, which may be configured, for example, to address one or more of the technical problems discussed above.

In some demonstrative embodiments, devices 102, 140, 160, and/or 180 may be configured to communicate according to a MU scheme, which may be configured to allow at least protection of one or more STAs participating in a MU ranging measurement, for example, MU ranging measurement procedure 200, e.g., as described below.

In some demonstrative embodiments, the MU scheme may be configured to allow, for example, independent privacy, e.g., even to each STA participating in a MU Range measurement, e.g., as described below.

In some demonstrative embodiments, devices 102, 140, 160, and/or 180 may be configured to communicate according to a MU protocol, which may be configured, for example, to allow protecting DL NDPs, which may be communicated as part of the MU ranging measurement, e.g., as described below.

In some demonstrative embodiments, devices 102, 140, 160, and/or 180 may be configured to perform one or more operations and/or communications of a MU ranging measurement, which may be configured, for example, to allow at least a secured range measurement, and/or to prevent spoofing by an adversary, e.g., in a High Efficiency (HE) MU operation mode, for example, even if the adversary is part of the STAs interacting in the MU ranging measurement, e.g., as described below.

In some demonstrative embodiments, the MU ranging measurement may be configured, for example, to allow at least a private anti-spoofing mechanism, for example, even in an untrusted environment of clients, for example, between each other or private but not authenticated clients, e.g., in case a client is a costumer in a shopping mall willing to share it analytics in anonymous manner, e.g., as described below.

For example, the MU ranging measurement, may be configured, for example, to allow at least implementation for an environment with trusted clients, e.g., where a higher security level is required, for example, by preventing a breach to a single client, which may result in a breach of all clients.

In some demonstrative embodiments, devices 102, 140, 160 and/or 180 may be configured to perform one or more operations of a MU ranging procedure, which may utilize protected sounding symbols, which may be protected, for example, based on a protection sequence, e.g., a random or pseudo random sequence, which may be applied, for example, to the one or more sounding symbols, e.g., as described below.

In some demonstrative embodiments, devices 102, 140, 160, and/or 180 may be configured to communicate according to a MU protocol, which may be configured, for example, to allow communicating separate and/or independent protected DL NDPs to the STAs, for example, such that a STA may be able to receive a separate and/or an independent NDP, which may be separately and/or independently protected for the STA, for example, in a manner which may protect a DL NDP from one or more other STAs of the MU protocol, e.g., as described below.

In some demonstrative embodiments, devices 102, 140, 160, and/or 180 may be configured to communicate according to a MU protocol, which may be configured, for example, to allow communicating a separate DL NDP, which may be multiplexed for example, using a P-matrix scheme, a Time Division Multiple-Access (TDMA) scheme, an Orthogonal Frequency Multiple Access (OFDMA) Resource Unit (RU) division, and/or any other multiplexing scheme, which may be configured to allow communicating separate NDP frames to a plurality of STAs e.g., as described below.

In some demonstrative embodiments, for example, a DL NDP frame, e.g., each separate DL NDP frame, may carry, for example, a separate channel training signal to each individual locating STA, e.g., as described below.

In some demonstrative embodiments, a DL NDP, e.g., each DL NDP, may be protected by separate and/or independent protection information, e.g., as described below.

In some demonstrative embodiments, for example, a DL NDP, e.g., each DL NDP, may utilize a separate key and/or an Initialization Vector (IV) to create, for example, a separate private NDP training signal sequence, for example, for each STA or for a group of STAs, e.g., as described below.

In some demonstrative embodiments, device 140 may be configured to generate a plurality of sounding sequences corresponding to a plurality of STAs, in a manner which may be configured to enable at least secured range measurement, and/or may prevent spoofing by an adversary, e.g., as described below.

In some demonstrative embodiments, controller 154 may be configured to control, cause, and/or trigger device 140 to generate a plurality of sounding sequences corresponding to a plurality of stations (STAs). For example, device 140 may generate the plurality of sounding sequences corresponding to devices 102, 160 and/or 180, e.g., as described below.

In some demonstrative embodiments, the plurality of sounding sequences may include at least first and second different sounding sequences, e.g., as described below.

In other embodiments, the plurality of sounding sequences may include more than two different sounding sequences, e.g., three different sounding sequences or more than three different sounding sequences.

In some demonstrative embodiments, the first sounding sequence may correspond to at least one first STA of the plurality of STAs, e.g., device 102.

In one example, the first sounding sequence may correspond only to a single STA of the plurality of STAs, for example, device 102, e.g., as described below.

In another example, the first sounding sequence may correspond to two or more STAs of the plurality of STAs, for example, to a first group of stations the plurality of STAs, e.g., as described below.

In some demonstrative embodiments, the second sounding sequence may correspond to at least one second STA of the plurality of STAs, for example, device 160, e.g., as described below.

In one example, the second sounding sequence may correspond only to a single STA of the plurality of STAs, for example, device 160, e.g., as described below.

In another example, the second sounding sequence may correspond to two or more STAs of the plurality of STAs, e.g., to a second group of stations of the plurality of STAs, for example, different from the first group, e.g., as described below.

In some demonstrative embodiments, controller 154 may be configured to control, cause, and/or trigger device 140 to transmit a MU frame to indicate a MU DL transmission, for example, during a MU ranging measurement, e.g., as described below.

In some demonstrative embodiments, the MU frame may include an NDPA to announce an MU DL NDP transmission, e.g., as described below.

In some demonstrative embodiments, the MU frame may include a MU trigger frame, e.g., as described below.

In other embodiments, the MU frame may include any other frame to indicate, schedule, configure and/or announce transmission of the MU DL transmission.

In some demonstrative embodiments, device 140 may be configured to transmit a MU DL NDP transmission to the plurality of STAs, for example, following the transmission of the MU frame, e.g., as described below.

In some demonstrative embodiments, controller 154 may be configured to control, cause, and/or trigger device 140 to transmit a MU DL NDP transmission to the plurality of STAs, e.g., following the MU frame.

In some demonstrative embodiments, the MU DL NDP transmission may be separated from the MU frame by a Short Inter-Frame-Space (SIFS), or any other time period.

In some demonstrative embodiments, controller 154 may be configured to control, cause, and/or trigger device 140 to transmit the MU DL NDP transmission a SIFS time after transmission of the MU frame.

In some demonstrative embodiments, the MU DL NDP transmission may include a plurality of Long Training Fields (LTFs) including the plurality of sounding sequences, e.g., as described below.

In some demonstrative embodiments, the plurality of LTFs may include a plurality of Very High Throughput (VHT) LTFs.

In demonstrative embodiments, the plurality of LTFs may include a plurality of High Efficiency (HE) Long Training Field (LTF) (HE-LTF) symbols, e.g., in accordance with an IEEE 802.11ax communication scheme.

In other embodiments, the plurality of LTF may include any other type of LTFs.

In some demonstrative embodiments, the MU frame may include allocation information to indicate an allocation of the plurality of LTFs to the plurality of STAs, e.g., as described below.

In some demonstrative embodiments, the allocation information may indicate to a STA of the plurality of STAs, which one or more LTFs of the plurality of LTFs includes a sounding sequence corresponding to, and/or to b e used by, the STA, e.g., as described below.

In some demonstrative embodiments, the MU DL NDP transmission may include more than one DL NDP, e.g., as described below.

In some demonstrative embodiments, the MU DL NDP transmission may include a first DL NDP including a first plurality of LTFs including the first sounding sequence, and/or a second DL NDP including a second plurality of LTFs including the second sounding sequence, e.g., as described below.

In some demonstrative embodiments, the MU DL NDP transmission may include a shared DL NDP to be shared by the first and second STAs, e.g., a single NDP or more than one NDP to be shared by the by the first and second STAs. For example, the shared DL NDP may be shared by devices 102 and 160, e.g., as described below.

In other embodiments, the shared NDP may be shared by more than two STAs of the plurality of STAs, for example, all of the plurality of STAs or some of, e.g., a subset of, the plurality of STAs.

In some demonstrative embodiments, the shared DL NDP may include one or more first LTFs including the first sounding sequence, and one or more second LTFs including the second sounding sequence.

In some demonstrative embodiments, the plurality of sounding sequences may include at least one shared sounding sequence to be shared by two or more STAs of the plurality of STAs. For example, the shared sounding sequence may be shared by devices 102 and 160, e.g., as described below.

In some demonstrative embodiments, the plurality of sounding sequences may include an individual sounding sequence, which correspond to a respective individual STA, e.g., as described below.

In some demonstrative embodiments, the plurality of sounding sequences may include two or more individual sounding sequences corresponding to two or more respective STAs of the plurality of STAs. For example, the plurality of sounding sequences may include a first sounding sequence corresponding to device 102, and/or a second sounding sequence corresponding to device 160, e.g., as described below.

In some demonstrative embodiments, the plurality of sounding sequences may include one or more "protected" sequences, which may be configured to protect, and/or secure the sequences, for example, against disclosure to and/or use by one or more third parties, e.g., as described below.

In some demonstrative embodiments, the plurality of sounding sequences may include a plurality of random sequences, e.g., as described below.

In some demonstrative embodiments, the plurality of sounding sequences may include one or more non-random sequences, for example, predefined, negotiated and/or agreed sequences. In one example, the plurality of sounding sequences may include one or more sequences for a STA, which may be predefined, negotiated and/or agreed upon with the STA.

In some demonstrative embodiments, the plurality of sounding sequences may include a plurality of binary sequences of "+1" and "−1", e.g., as described below. In other embodiments, the sounding sequences may utilize any other additional or alternative values.

In some demonstrative embodiments, controller 154 may be configured to control, cause, and/or trigger device 140 to determine the first sounding sequence based on a first random binary sequence, and/or to determine the second sounding sequence based on a second random binary sequence, e.g., as described below.

In some demonstrative embodiments, controller 154 may be configured to control, cause, and/or trigger device 140 to determine the first sounding sequence based on one or more keys and/or parameters, which may be agreed upon with the first STA, and/or determine the first sounding sequence based on one or more keys and/or parameters, which may be agreed upon with the first STA.

In other embodiments, controller 154 may be configured to control, cause, and/or trigger device 140 to determine the first sounding sequence and/or the second sounding sequence based on any other additional or alternative parameter.

In some demonstrative embodiments, controller 154 may be configured to control, cause, and/or trigger device 140 to dynamically change at least one of the first or second sounding sequences, e.g., as described below.

In some demonstrative embodiments, the plurality of STAs may receive the MU frame from device 140, for example, during the MU ranging measurement—e.g., as described below.

In some demonstrative embodiments, the plurality of STAs may receive the MU DL NDP transmission from device 140, for example, following the MU frame, e.g., as described below.

In some demonstrative embodiments, device 102 may receive, e.g., during the MU ranging measurement, the MU frame to indicate the MU DL transmission, and the MU DL NDP transmission from device 140, e.g., as described below.

In some demonstrative embodiments, controller 124 may be configured to control, cause, and/or trigger device 102 to receive the MU frame from device 102 to indicate the MU DL transmission, e.g., as described below.

In some demonstrative embodiments, the MU frame may include allocation information to indicate the allocation of the plurality of LTFs to the plurality of STAs, e.g., as described below.

In some demonstrative embodiments, the allocation information may indicate the allocation of the plurality of LTFs to the plurality of STAs including device 102.

In some demonstrative embodiments, the allocation information may indicate to device 102, which one or more LTFs of the plurality of LTFs includes a sounding sequence corresponding to device 102, e.g., as described below.

In some demonstrative embodiments, controller 124 may be configured to control, cause, and/or trigger device 102 to receive the MU DL NDP transmission including the plurality of LTFs, e.g., from device 140, for example, following the MU frame, e.g., as described below.

In some demonstrative embodiments, controller 124 may be configured to control, cause, and/or trigger device 102 to determine one or more measurements on the one or more LTFs, which include the sounding sequence corresponding to device 102.

In some demonstrative embodiments, the or more measurements on the one or more LTFs may include one or more measurements, for example, timing measurements, channel response measurements, and/or sounding measurements, which may be performed as part of and/or used as part of a range measurement, an FTM measurement, a ToF measurement, an RTT measurement, and/or any other additional or alternative measurement related to a range between devices 102 and 140.

In some demonstrative embodiments, the allocation information may indicate which DL NDP of the plurality of DL NDPs in the MU DL NDP transmission is to include the one or more LTFs including the sounding sequence corresponding to device 102.

In one example, device 140 may transmit the first DL NDP including the first plurality of LTFs including the first sounding sequence, and the second DL NDP including the second plurality of LTFs including the second sounding sequence. According to this example, the allocation information may indicate which one of the first and second DL NDPs includes the LTFs including the sounding sequence corresponding to device 102.

In some demonstrative embodiments, a DL NDP of the MU DL transmission may include one or more first LTFs including the first sounding sequence, and one or more second LTFs including the second sounding sequence.

In some demonstrative embodiments, the allocation information may indicate which one or more LTFs in the DL NDP include the one or more LTFs including the sounding sequence corresponding to device 102.

In one example, device 140 may transmit the first DL NDP including one or more first LTFs and one or more second LTFs, the one or more first LTFs including a first sounding sequence corresponding to device 102, and the one or more second LTFs including a second sounding sequence corresponding to device 160. According to this example, the allocation information may indicate that the first LTFs are to include the sounding sequence corresponding to device 102.

In some demonstrative embodiments, the sounding sequence corresponding to device 102 may be shared by device 102 and at least one other STA of the plurality of STAs, e.g., STA 160, for example, if device 140 transmits a shared sounding sequence to be shared by devices 102 and 160.

In some demonstrative embodiments, the allocation information may indicate the shared sounding sequence.

In some demonstrative embodiments, the sounding sequence corresponding to device 102 may include an individual sounding sequence individually assigned to device 102, for example, if device 140 transmits an individual sounding sequence individually assigned to device 102.

In one example, the allocation information may indicate, e.g., in the MU frame, the individual sounding sequence individually assigned to device 102.

In some demonstrative embodiments, controller 124 may be configured to control, cause, and/or trigger device 102 to transmit to device 140 an LMR as part of a MU Uplink (UL) transmission, for example, following the MU DL NDP transmission, e.g., as described below.

In some demonstrative embodiments, device 140 may receive the LMR from device 102, e.g., as described below.

In some demonstrative embodiments, controller 154 may be configured to control, cause, and/or trigger device 140 to receive a MU Uplink (UL) transmission including a plurality of LMRs from the plurality of STAs, for example, following the MU DL NDP transmission. For example, controller 154 may be configured to control, cause, and/or trigger device 140 to receive the LMR from device 102, e.g., as part of the MU transmission from the plurality of STAs.

In some demonstrative embodiments, device 102 may determine a range measurement, for example, based on the sounding sequence corresponding to device 102, e.g., to support estimation of a location of device 102 and/or a range of device 102 from device 140. For example, the range measurement may include an FTM measurement, a ToF measurement, an RTT measurement, and/or any measurement, which may be configured as part of a range measurement.

In some demonstrative embodiments, a sounding sequence corresponding to a STA of the plurality of STAs, e.g., device 102, may be defined, for example, based on sequence generation information, e.g., as described below.

In some demonstrative embodiments, a sounding sequence corresponding to a STA may be protected, for example, based on a protection sequence, e.g., a random or pseudo random sequence, which may be applied, for example, to the one or more sounding symbols, e.g., as described below.

In one example, the sounding sequence corresponding to device 102 may be generated, for example, based on a random seed.

In another example, a sounding sequence corresponding to a STA may be generated, for example, based on any other method, function and/or algorithm.

In some demonstrative embodiments, controller 154 may be configured to control, cause, and/or trigger device 140 to transmit to device 102 sequence generation information to define the sounding sequence corresponding to device 102, e.g., as described below.

In some demonstrative embodiments, device 102 may receive the sequence generation information from device 140, e.g., as described below.

In some demonstrative embodiments, controller 124 may be configured to control, cause, and/or trigger device 102 to receive from device 140 the sequence generation information to define the sounding sequence corresponding to device 102.

In some demonstrative embodiments, controller 124 may be configured to control, cause, and/or trigger device 102 to determine one or more measurements on the one or more LTFs, which include the sounding sequence corresponding to device 102, for example, based on the sequence generation information.

In some demonstrative embodiments, device 102 may not be required to determine the range measurement locally, e.g., at device 102. For example, the range measurement may be determined at a remote device, e.g., as described below.

In some demonstrative embodiments, device 140 may be configured to determine the range measurement for device 102, for example, based on a feedback from device 102, e.g., as described below.

In one example, in some ranging applications, a receiver of a sounding signal, e.g., device 102, may not be required to process the received sounding signal. Instead, for example, the receiver may feed the received signals back to the transmitter, e.g., device 140, for example, for estimating the time of arrival (ToA) of the received sounding signal. According to this example, a random sequence, e.g., to perform a range measurement, may not need to be known at the receiver, e.g., if the receiver does not estimate the channel response before sending the feedback. Since the transmitter knows the random sequence, the transmitter may detect the ToA, e.g., based on the feedback from the receiver. Therefore, in some cases, exchanging of a random seed may not be needed, and the transmitter may use any sequence, e.g., any random sequence, e.g., even a sequence with a low PAPR.

In some demonstrative embodiments, controller 124 may be configured to control, cause, and/or trigger device 102 to transmit to device 140 a feedback based on the one or more measurements, e.g., on the one or more LTFs including the sounding sequence corresponding to device 102, e.g., as described below.

In some demonstrative embodiments, device 140 may receive the feedback from device 102 and/or one or more other feedbacks from other STAs of the plurality of STAs, e.g., device 160.

In some demonstrative embodiments, controller 154 may be configured to control, cause, and/or trigger device 140 to receive from device 102 the feedback based on the measurement, at device 102, of the sounding sequence corresponding to device 102.

In some demonstrative embodiments, controller 154 may be configured to control, cause, and/or trigger device 140 to determine a range measurement corresponding to device 102, for example, based on the feedback form device 102.

In some demonstrative embodiments, device 140 may be configured to send the range measurement to device 102, for example, to enable device 102 to determine a location of device 102 and/or a range of device 102 from device 140.

Figure 3:
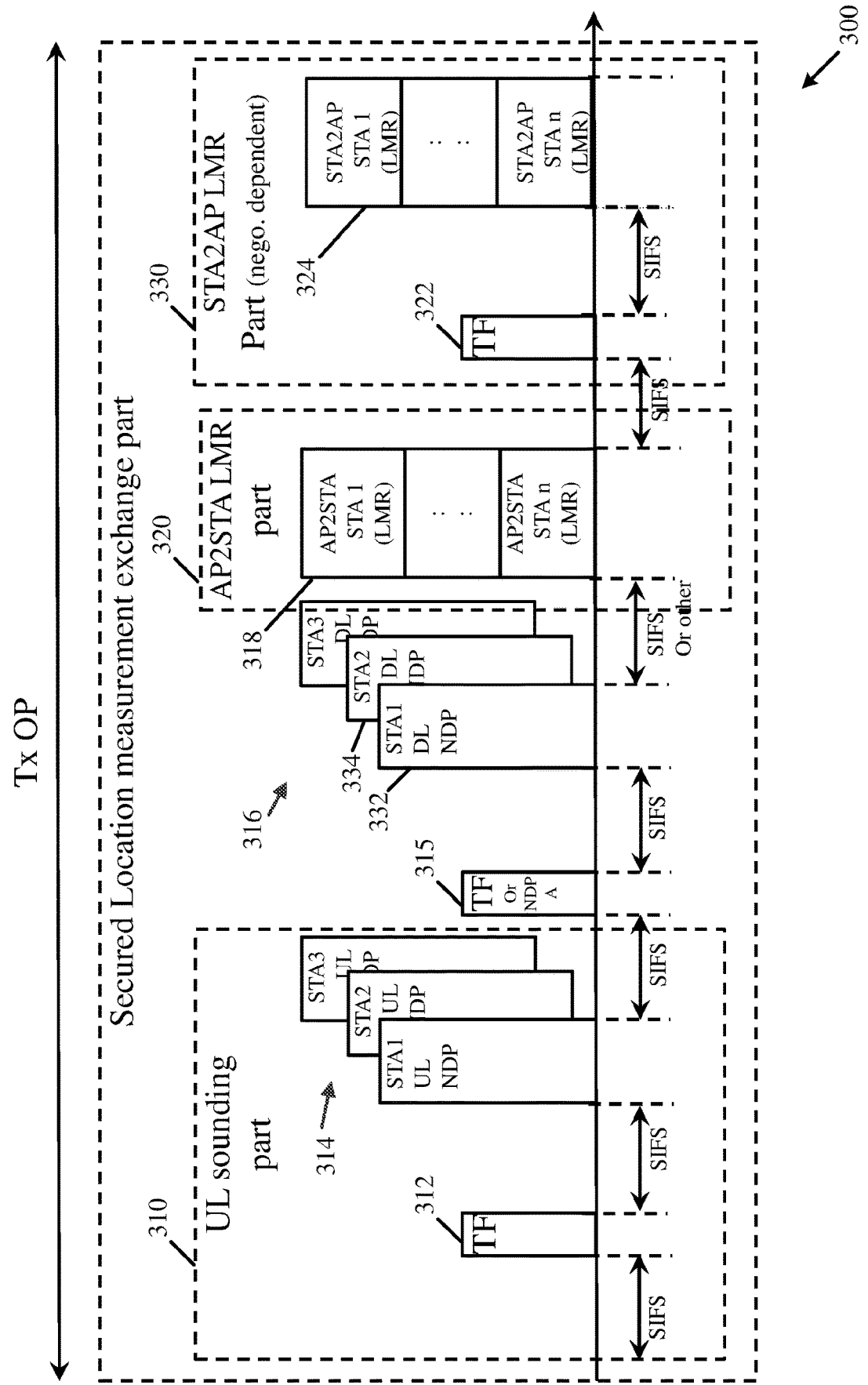
FIG. 3 is a schematic illustration of a MU ranging measurement procedure, in accordance with some demonstrative embodiments.

Reference is made to FIG. 3, which schematically illustrates a MU ranging measurement procedure 300, in accordance with some demonstrative embodiments.

In some demonstrative embodiments, an initiator of MU ranging measurement procedure 300 may include an AP or a STA, and/or a responder of MU ranging measurement procedure 300 may include a STA or an AP.

In some demonstrative embodiments, there may be multiple STAs ranging with the AP, any subset of the multiple STAs may be aware of a DL training signal sequence, e.g., as described below.

In one example, an AP, e.g., device 140 (FIG. 1), may perform MU ranging measurement procedure 300 with a plurality of stations, denoted "STA1", STA2" and "STA3", e.g., including devices 102, 160 and/or 180 (FIG. 1), for example, to perform a MU ranging measurements between the AP and the plurality of stations.

In some demonstrative embodiments, as shown in FIG. 3, MU ranging measurement procedure 300 may include an UL sounding part 310, during which the AP may transmit a trigger frame (TF) 312 to the plurality of stations, for example, to trigger a MU ranging measurement.

In some demonstrative embodiments, as shown in FIG. 3, the plurality of stations may transmit a plurality of UL sounding transmissions 314 to the AP, for example, as part of a MU uplink transmission, e.g., simultaneously, for example, during UL sounding part 310.

In one example, the plurality of UL sounding transmissions 314 may include a plurality of NDPs, e.g., from respective ones of the plurality of stations.

As shown in FIG. 3, the AP may transmit a frame 315 to the plurality of stations, for example, to indicate a shared DL NDP frame 316 to be transmitted to the plurality of stations.

In one example, frame 315 may include, or may be in the form of, an NDP Announcement (NDPA) to announce the MU DL NDP transmission 316.

In another example, frame 315 may include, or may be in the form of, a trigger frame to trigger the MU DL NDP transmission 316.

In another example, frame 315 may include, or may be in the form of, an aggregated NDPA plus trigger frame.

In another example, frame 315 may include, or may be in the form of any other frame.

In some demonstrative embodiments, as shown in FIG. 3, the AP may transmit the MU DL NDP transmission 316 to the plurality of STAs.

In some demonstrative embodiments, directions of the transmissions 314 and 316 may be reversed.

In some demonstrative embodiments, as shown in FIG. 3, the MU DL NDP transmission 316 may include a plurality of DL NDP frames corresponding to the plurality of STAs, e.g., as described above.

In some demonstrative embodiments, a DL NDP of NDP transmission 316 may include a plurality of LTFs including a sounding sequence corresponding to a STA, e.g., as described above.

In one example, a first DL NDP 332 may include a first plurality of LTFs including a first sounding sequence corresponding to STA1, and/or a second DL NDP 334 may include a second plurality of LTFs including a second sounding sequence corresponding to STA2.

In some demonstrative embodiments, a DL NDP, e.g., DL NDP 332 or DL NDP 334, may be, for example, unique to each STA, and/or may use separate keying material to modulate sounding subcarriers (SCs) for the STA, e.g., as described above.

In some demonstrative embodiments, frame 315 may include allocation information to indicate which DL NDP of the plurality of DL NDP frames in MU DL NDP transmission 316 corresponds to which STA of the plurality of STAs, e.g., as described above.

In some demonstrative embodiments, the DL NDPs 316 and/or the UL NDPs 314 may be multiplexed in a code-domain, e.g., according to a P-matrix.

In other embodiments, any other multiplexing schemes, which include a separate sounding sequence per STA may be implemented, for example, to provide protection to MU ranging measurement procedure 300.

Some embodiments are described herein with respect to communicating a separate DL NDP to each STA. However, in other embodiments, a DL NDP may be protected and communicated to a group of two or more STAs. For example, the MU sequence may include a plurality of group protected DL NDPs, for example, wherein a group protected DL NDP may be protected for a group of STAs in the MU sequence, e.g., as described above.

In one example, the MU sequence may include a first group DL protected NDP for a first group of STAs, and a second group DL protected NDP for a second group of STAs, e.g., as described above.

In some demonstrative embodiments, frame 315 and and/or MU DL NDP transmission 316 may be sent, for example, by a PHY layer, for example, an IEEE 802.11ax PHY layer and/or any other layer.

In some demonstrative embodiments, as shown in FIG. 3, MU ranging measurement procedure 300 may include an AP to STA LMR (AP2STLMR) part 320, during which the AP may transmit a MU LMR 318 to the plurality of stations, for example, in the form of a MU downlink transmission. For example, LMR 318 may include, for a station, one or more ranging measurements between the AP and the STA, e.g., based on an UL sounding transmission 314 from the STA and/or a shared DL NDP frame 316 to the STA.

In some demonstrative embodiments, the plurality of stations may be configured to determine one or more positioning parameters, for example, based on LMR 318, MU sounding transmission 316, and/or the plurality of sounding transmissions 314.

In some demonstrative embodiments, as shown in FIG. 3, MU ranging measurement procedure 300 may include a STA to AP LMR (STA2APLMR) part 330, during which the AP may transmit a TF 322 to the plurality of stations, for example, to trigger a plurality of LMRs from the plurality of stations.

In some demonstrative embodiments, as shown in FIG. 3, the plurality of stations may transmit a plurality of LMRs 324 to the AP, for example, as part of a MU uplink transmission, e.g., simultaneously.

In some demonstrative embodiments, the AP may be configured to determine one or more positioning parameters with respect to the AP and/or the plurality of stations, for example, based on LMRs 324.

In some demonstrative embodiments, a measurement report, e.g., LMR 318 and/or LMRs 324, may be transmitted in one or both directions.

In some demonstrative embodiments, one or more of the messages of the FIG. 3 may be communicated as part of a measurement phase, e.g., as part of MU ranging measurement procedure 300.

In some demonstrative embodiments, there may be a negotiation phase before the measurement phase.

In some demonstrative embodiments, encryption information, e.g. a random seed, and/or any other encryption and/or keying information, for protecting the measurement phase, may be exchanged between the AP and the STAs, for example, in the negotiation phase, as part of MU ranging measurement procedure 300, or separately.

In some demonstrative embodiments, further protection information, e.g., a new random seed, may be carried by a subsequent trigger frame, a report frame, and/or a feedback frame in the measurement phase.

Figure 4:
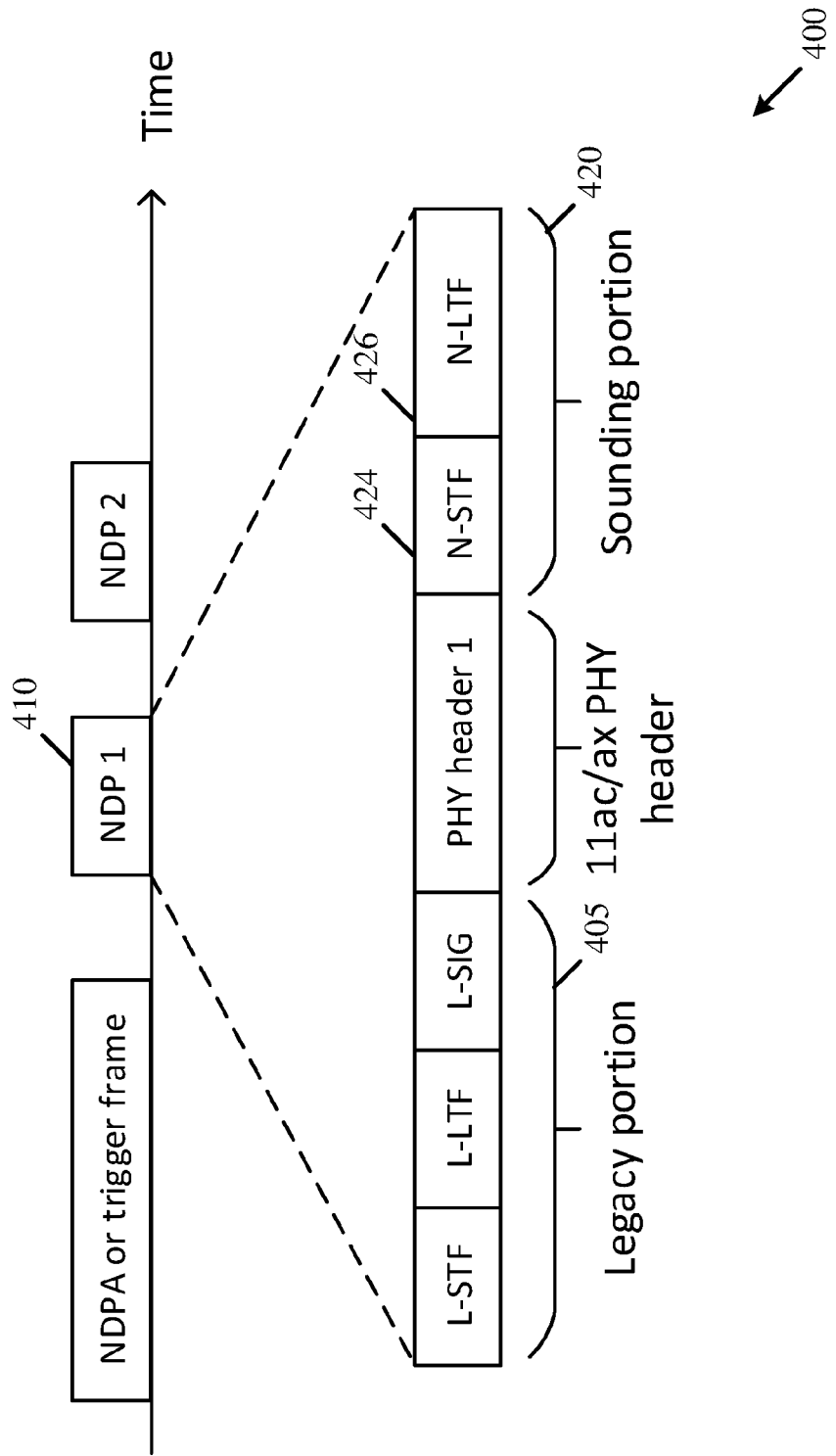
FIG. 4 is a schematic illustration of a structure of a sounding signal, in accordance with some demonstrative embodiments.

Reference is made to FIG. 4, which schematically illustrates a structure 400 of a sounding signal, in accordance with some demonstrative embodiments.

In some demonstrative embodiments, the sounding signal may include an NDP 410. In other embodiments sounding, the sounding signal may include any other frame.

In one example, one or more fields of the NDP 410 may be included as part of a sounding frame, for example, a DL sounding frame, e.g., a DL NDP 334 (FIG. 3).

In some demonstrative embodiments, for example, as shown in FIG. 4, the NDP 410 may include, for example, a legacy portion 405, which may be used, for example, for detecting an arrival of the NDP 410.

In some demonstrative embodiments, for example, as shown in FIG. 4, the NDP 410 may include, for example, a sounding portion 420, which may be configured, for example, to be used for estimating a channel response.

In some demonstrative embodiments, for example, as shown in FIG. 4, the sounding portion 420 may include, for example, a Short Training Field (STF) portion, e.g., an N-STF portion 424, which may be used, for example, for Automatic Gain Control (AGC) setting.

In some demonstrative embodiments, for example, as shown in FIG. 4, the sounding portion 420 may include, for example, an LTF portion, e.g., an N-LTF 426, which may be used, for example, for channel estimation.

In some demonstrative embodiments, the N-LTF 426 may include a sequence of symbols in a frequency-domain.

In one example, N-LTF portion 424 may include a plurality of LTFs, e.g., including a sequence of N LTF symbols, wherein N is an integer. In one example, N may be equal to eight. In other embodiments, N may include any other integer, e.g., less than eight or greater than eight.

In some demonstrative embodiments, a STA receiving NDP 410, e.g., device 102 (FIG. 1), may be configured to perform a channel estimation, which may be used, for example, to determine a time of arrival (ToA) of a first channel path of NDP 410.

Some demonstrative embodiments, one or more elements of sounding portion 420 may be configured to prevent an eavesdropper from reading and/or determining contents of the N-STF 424 and/or N-LTF 426. For example, N-STF 424 and N-LTF 426 may include an HE-STF, and an HE-LTF, respectively, or any other MU STF-LTF pair.

In some demonstrative embodiments, at least a portion of the NDP 410, for example, the N-LTF 426, may be configured to be unreadable to an eavesdropper, for example, in the DL and/or the UL, e.g., in the DL as well as the UL.

In some demonstrative embodiments, an LTF symbol in N-LTF 426 may include a binary sequence of "+1" and "−1", e.g., in accordance with an IEEE 802.11ax. Specification.

In other embodiments, the LTF symbol may include any other values.

In some demonstrative embodiments, for example, device 140 (FIG. 1) may be configured to transmit a MU DL NDP transmission including one or more NDPs 410, e.g., NDPs 316 (FIG. 3), which may include the at least first and second different sounding sequences corresponding to the plurality of stations in LTFs 426, e.g., as described above.

Figure 5:
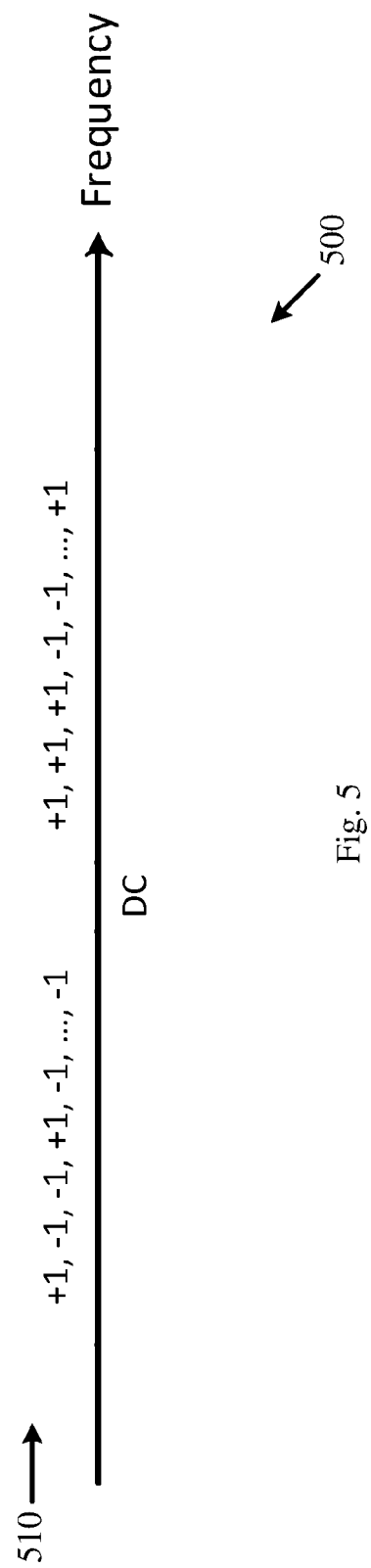
FIG. 5 is a schematic illustration of a training field sequence, in accordance with some demonstrative embodiments.

Reference is made to FIG. 5, which a schematic illustrates a training field sequence 500, in accordance with some demonstrative embodiments.

In one example, training field sequence 500 may include an LTF sequence, for example, in N-LTF 426 (FIG. 4), e.g., a symbol of the sequence of N LTF symbols included in N-LTF 426 (FIG. 4).

In some demonstrative embodiments, as shown in FIG. 5, training field sequence 500 may include a binary sequence 510, e.g., of "+1" and "−1".

In some demonstrative embodiments, for example, for security and/or privacy, the N-LTF sequence, e.g., in N-LTF 426 (FIG. 4), may be dynamically generated, for example, to generate an N-LTF sequence that is different from a static sequence, e.g., a static sequence in accordance with an IEEE 802.11ax Specification.

In some demonstrative embodiments, a device, e.g., device 140 (FIG. 1), may be configured to generate binary sequence 510, which may include a random or pseudo random binary sequence, e.g., as described below. For example, the binary sequence 510 may be included in an LTF, e.g., N-LTF 426 (FIG. 4), of a sounding transmission, e.g., NDP 410 (FIG. 1).

In some demonstrative embodiments, the random or pseudo random binary sequences may be generated, for example, by reusing a scrambling sequence generator, e.g., in accordance with an IEEE 802.11 *Specification*.

In other embodiments, the random or pseudo random binary sequences may be generated according to any other mechanism.

In some demonstrative embodiments, a random seed, e.g., of the scrambling sequence generator, may be exchanged, for example, between a transmitter of an NDP, e.g., NDP 410 (FIG. 4), for example, device 140 (FIG. 1), and a receiver of the NDP, e.g., device 102 (FIG. 1), for example, before the measurement phase, for example, before MU positioning procedure 300, e.g., in a negotiation phase between the transmitter and the receiver.

In some demonstrative embodiments, the random seed may be sent by an encrypted protocol. For example, using a same random seed, the transmitter and the receiver may generate a same sounding sequence, e.g., synchronously.

In some demonstrative embodiments, the binary sequence 510 may be configured, for example, to achieve a low Peak to Average Power Ratio (PAPR), e.g., as described below.

In some demonstrative embodiments, the PAPR of a random sounding sequence, e.g., binary sequence 510, may be substantially the same as a PAPR of a Binary Phase Shift Keying (BPSK) data payload, which in turn, may be lower than a PAPR of a higher order Quadrature Amplitude Modulation (QAM).

In some demonstrative embodiments, for example, if a PAPR of a random sounding sequence may be a concern, a set of sounding sequences with good PAPRs may be defined, and a selected sounding sequence may be selected from the set of the sounding sequences, e.g., randomly, for example, for a sounding signal. The random selection may be synchronized between a transmitter and a receiver, e.g., between device 140 (FIG. 1) and one or more of devices 102, 160 and/or 180 (FIG. 1). In one example, a seed for the random selection may be exchanged, e.g., between the transmitter and the receiver, for example, before the transmission of the sounding signal.

Figure 6:
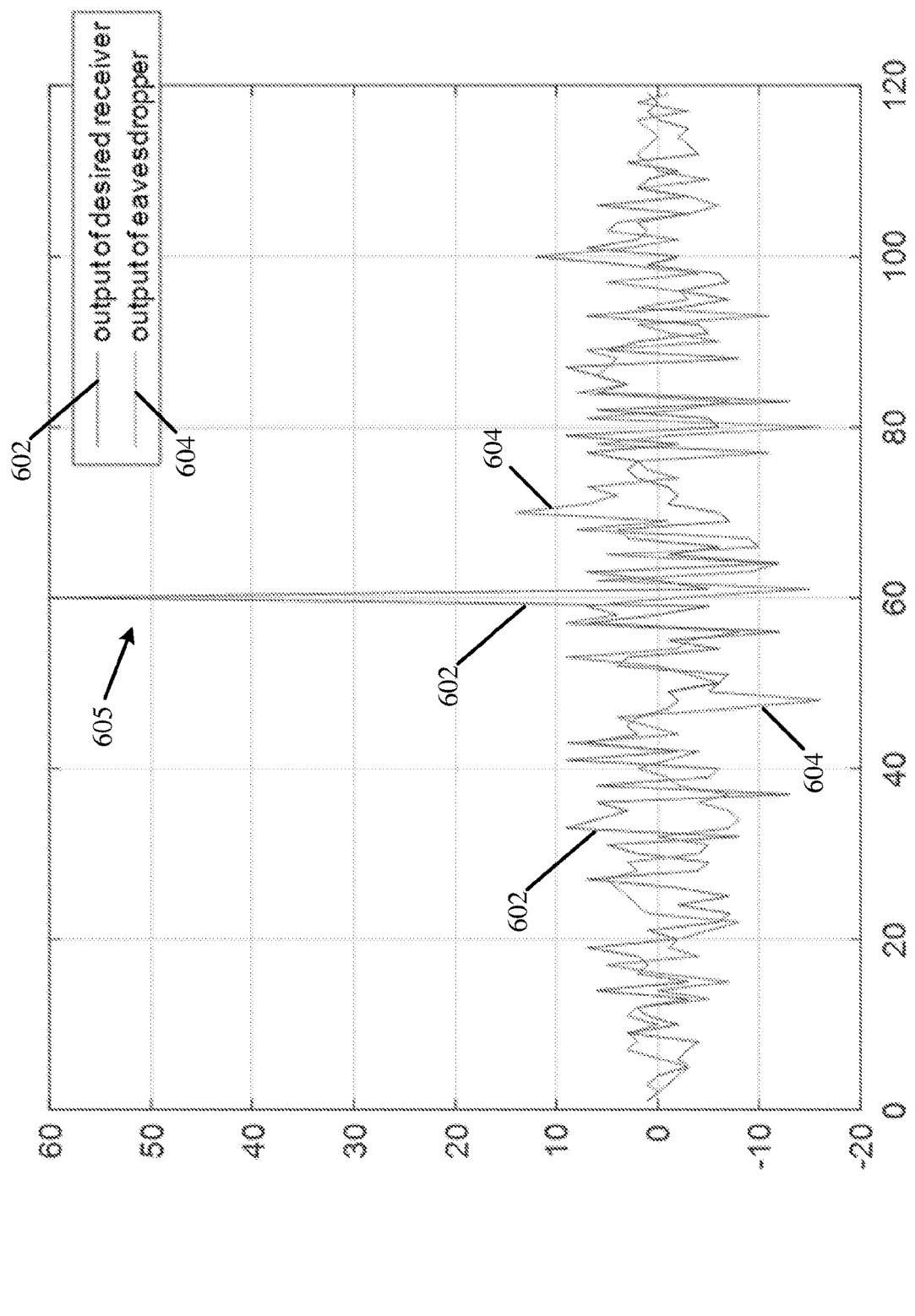
FIG. 6 is a schematic illustration of a graph depicting measurements detected by a receiver station and an eavesdropper station, in accordance with some demonstrative embodiments.

Reference is made to FIG. 6, which schematically illustrates a graph 600 depicting measurements at a receiver of a sounding signal versus time, in accordance with some demonstrative embodiments.

In some demonstrative embodiments, the X-axis of graph 600 may represent a time of arrival of the sounding signal at the receiver, and the Y-axis of graph 600 may represent an output of a matched filter of the receiver.

As shown in FIG. 6, a first curve 602 depicts an output of a first receiver of a first station, for example, a station implemented in accordance with some demonstrative embodiments, e.g., device 102 (FIG. 1).

As shown in FIG. 6, a second curve 604 depicts an output of a second receiver of a second station, e.g., an eavesdropper station.

In some demonstrative embodiments, the first station may have knowledge of a random sounding sequence used by the sounding signal, while the eavesdropper station may not be aware of the random sounding sequence, which may be used to protect the sounding signal.

In some demonstrative embodiments, as shown in FIG. 6, curve 602 may include a sharp peak 605, which indicate a TOA of a selected path of the signal.

In some demonstrative embodiments, as shown in FIG. 6, curve 604 may not include the sharp peak, and accordingly the eavesdropper may not be able to determine the TOA of the selected path of the signal.

In one example, a channel may only have a single path, and a detector of a STA, e.g., the station or the eavesdropper STA, may include a matched filter to detect the path. In other embodiments, the channel may include multiple paths, and/or any other detector may be used.

In some demonstrative embodiments, a detector of the station may be able to detect the arrival of the path, e.g., by detecting sharp peak 605 at the output of the first receiver, e.g., as shown by curve 602.

In some demonstrative embodiments, a detector of the eavesdropper station may not know the sounding sequence and, accordingly, may not be able to detect the arrival of the path accurately, e.g., as shown by curve 604.

Figure 7:
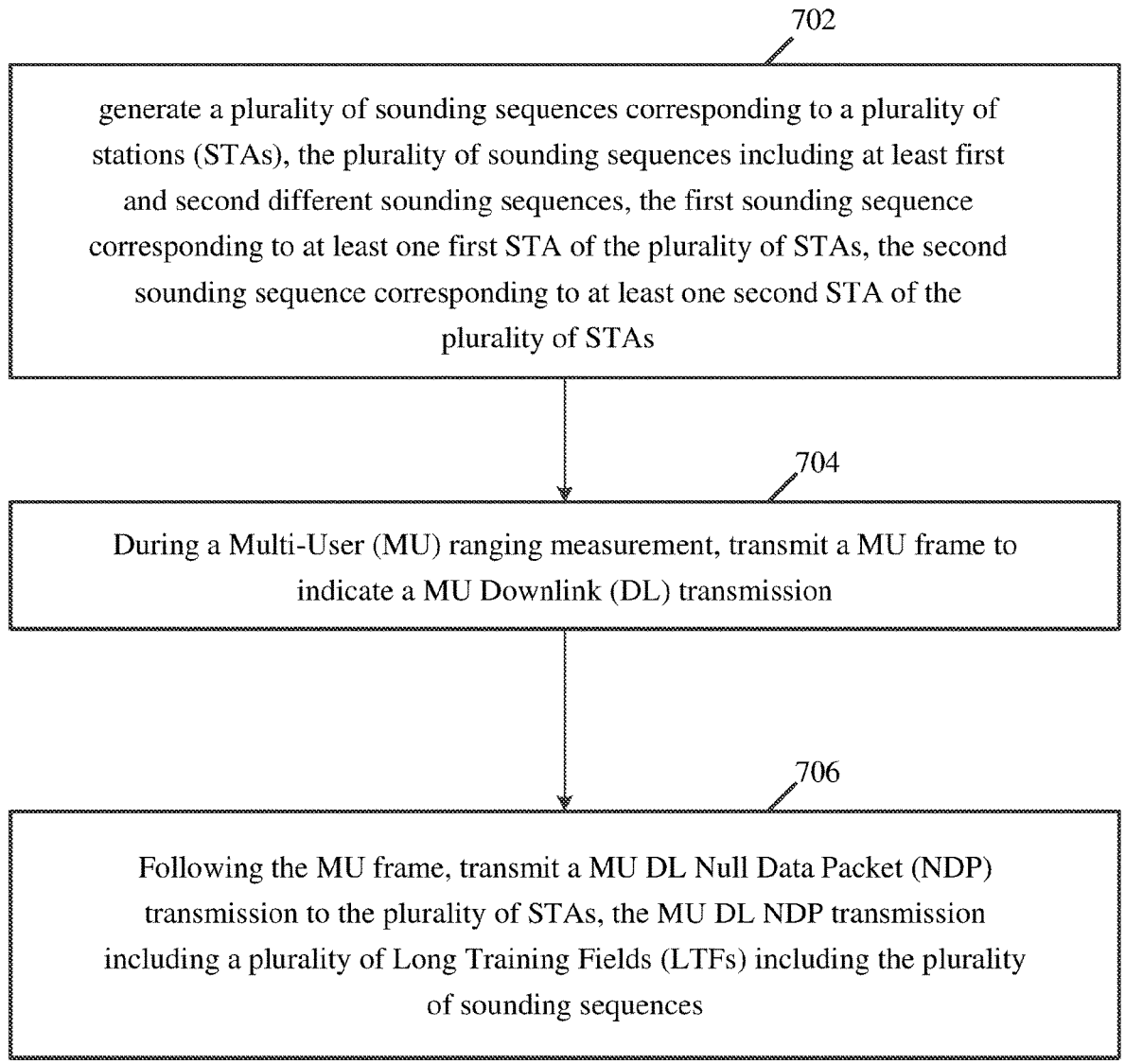
FIG. 7 is a schematic flow-chart illustration of a method of a MU ranging measurement, in accordance with some demonstrative embodiments.

Reference is made to FIG. 7, which schematically illustrates a method of a MU ranging measurement, in accordance with some demonstrative embodiments. For example, one or more of the operations of the method of FIG. 7 may be performed by a wireless communication system, e.g., system 100 (FIG. 1); a wireless communication device, e.g., devices 102, 140, 160 and/or 180 (FIG. 1); a controller, e.g., controllers 124 and/or 154 (FIG. 1); a positioning component, e.g., positioning components 117 and/or 157 (FIG. 1); a radio, e.g., radios 114 and/or 144 (FIG. 1); a location estimator, e.g., location estimator 115 (FIG. 1); a message processor, e.g., message processor 128 (FIG. 1) and/or message processor 158 (FIG. 1); a transmitter, e.g., transmitters 118 and/or 148 (FIG. 1); and/or a receiver, e.g., receivers 116 and/or 146 (FIG. 1).

As indicated at block 702, the method may include generating a plurality of sounding sequences corresponding to a plurality of STAs, the plurality of sounding sequences including at least first and second different sounding sequences, the first sounding sequence corresponding to at least one first STA of the plurality of STAs, the second sounding sequence corresponding to at least one second STA of the plurality of STAs. For example, controller 154 (FIG. 1) may control, cause and/or trigger device 140 (FIG. 1) to generate the plurality of sounding sequences corresponding to the plurality of STAs, the plurality of sounding sequences including the first sounding sequence, e.g., a first sequence 510 (FIG. 5), corresponding to device 102 (FIG. 1) and the second sounding sequence, e.g., a second sequence 510 (FIG. 5), corresponding to device 160 (FIG. 1), e.g., as described above.

As indicated at block 704, the method may include transmitting a MU frame to indicate a MU DL transmission, e.g., during a MU ranging measurement. For example, controller 154 (FIG. 1) may control, cause and/or trigger device 140 (FIG. 1) to transmit the MU frame 315 (FIG. 3) during the MU ranging measurement 300 (FIG. 3) to indicate the MU DL transmission 316 (FIG. 3), e.g., as described above.

As indicated at block 706, the method may include transmitting a MU DL NDP transmission to the plurality of STAs, e.g., following the MU frame, the MU DL NDP transmission including a plurality of LTFs comprising the plurality of sounding sequences. For example, controller 144 (FIG. 1) may control, cause and/or trigger device 140 (FIG. 1) to, following the MU frame 315 (FIG. 3), transmit the MU DL transmission 316 (FIG. 3) to the plurality of STAs, the MU DL transmission 316 (FIG. 3) including the plurality of LTFs, e.g., in N-LTF 426 (FIG. 4) of one or more NDPs 410 (FIG. 4), including the plurality of sounding sequences, e.g., as described above.

Figure 8:
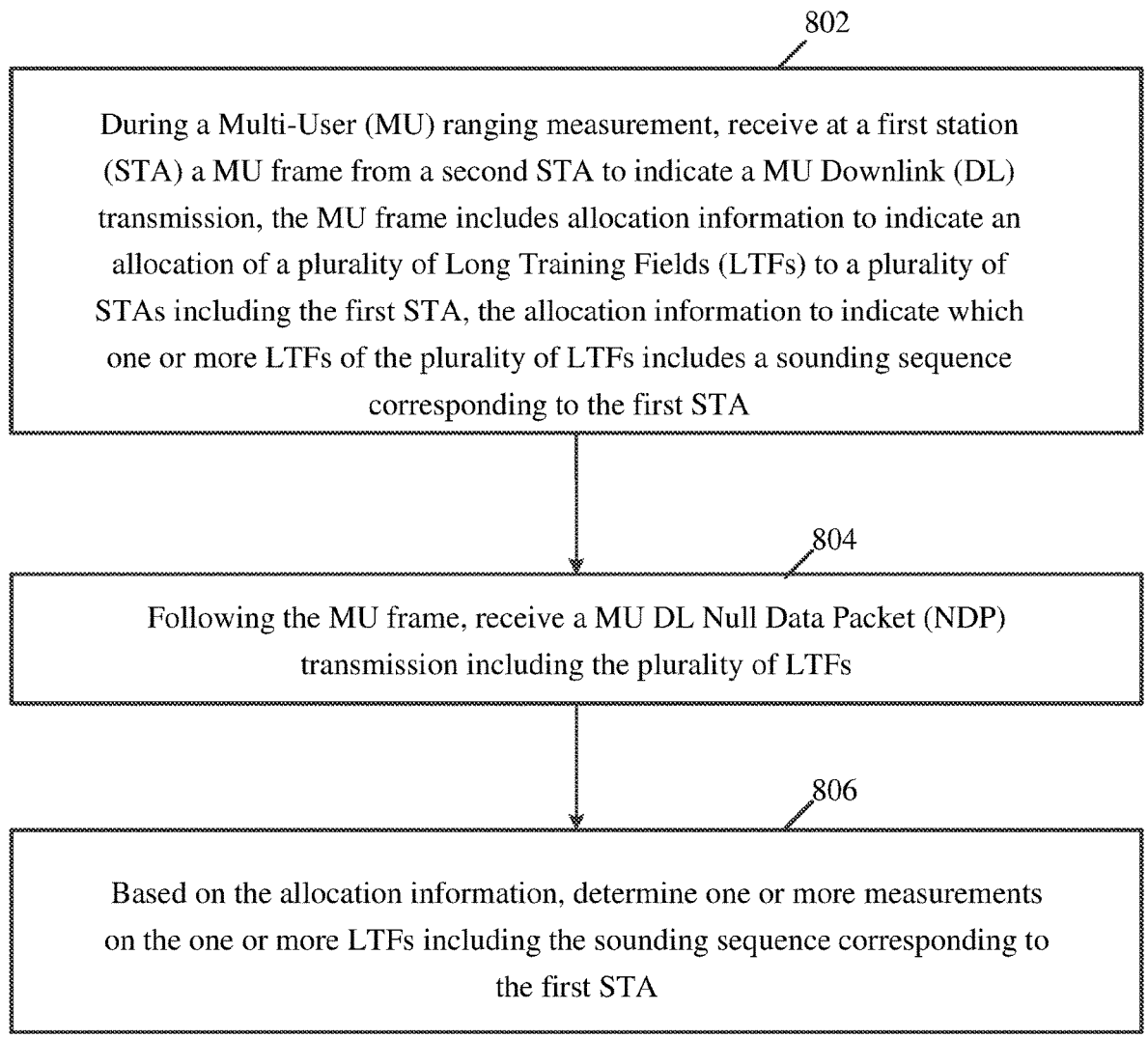
FIG. 8 is a schematic flow-chart illustration of a method of a MU ranging measurement, in accordance with some demonstrative embodiments.

Reference is made to FIG. 8, which schematically illustrates a method of MU ranging measurement, in accordance with some demonstrative embodiments. For example, one or more of the operations of the method of FIG. 8 may be performed by a wireless communication system, e.g., system 100 (FIG. 1); a wireless communication device, e.g., devices 102, 140, 160 and/or 180 (FIG. 1); a controller, e.g., controllers 124 and/or 154 (FIG. 1); an application, e.g., application 125 (FIG. 1); a positioning component, e.g., positioning components 117 and/or 157 (FIG. 1); a location estimator, e.g., location estimator 115 (FIG. 1); a radio, e.g., radios 114 and/or 144 (FIG. 1); a message processor, e.g., message processor 128 (FIG. 1) and/or message processor 158 (FIG. 1); a transmitter, e.g., transmitters 118 and/or 148 (FIG. 1); and/or a receiver, e.g., receivers 116 and/or 146 (FIG. 1).

As indicated at block 802, the method may include, during a MU ranging measurement, receiving at a first STA a MU frame from a second STA to indicate a MU DL transmission, the MU frame includes allocation information to indicate an allocation of a plurality of LTFs to a plurality of STAs including the first STA, the allocation information to indicate which one or more LTFs of the plurality of LTFs includes a sounding sequence corresponding to the first STA. For example, controller 124 (FIG. 1) may control, cause and/or trigger device 102 (FIG. 1) to receive MU frame 315 (FIG. 3) from device 140 (FIG. 1) to indicate the MU DL transmission 316 (FIG. 3), MU frame 315 (FIG. 3) may include the allocation information to indicate the allocation of the plurality of LTFs to the plurality of STAs including device 102 (FIG. 1), the allocation information to indicate which one or more LTFs of the plurality of LTFs, e.g., which LTFs of N-LTF 426 (FIG. 4) in one or more NDPs 410 (FIG. 4), includes the sounding sequence corresponding to device 102 (FIG. 1), e.g., as described above.

As indicated at block 804, the method may include receiving a MU DL NDP transmission including the plurality of LTFs, e.g., following the MU frame. For example, controller 124 (FIG. 1) may control, cause and/or trigger device 102 (FIG. 1) to receive the MU DL transmission 316 (FIG. 3) including the plurality of LTFs, for example, following reception of MU frame 315 (FIG. 3), e.g., as described above.

As indicated at block 806, the method may include determining, e.g., based on the allocation information, one or more measurements on the one or more LTFs including the sounding sequence corresponding to the first STA. For example, controller 124 (FIG. 1) may control, cause and/or trigger device 102 (FIG. 1) to, based on the allocation information, determine the one or more measurements on the one or more LTFs including the sounding sequence corresponding to device 102 (FIG. 1), e.g., as described above.

Figure 9:
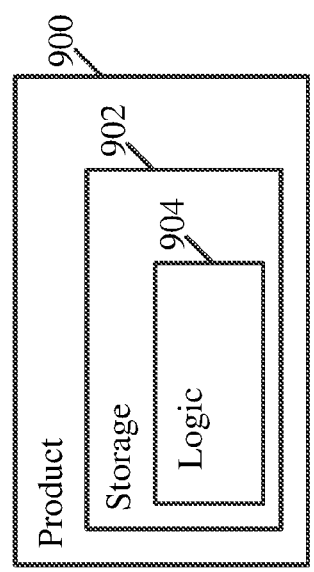
FIG. 9 is a schematic illustration of a product of manufacture, in accordance with some demonstrative embodiments.

Reference is made to FIG. 9, which schematically illustrates a product of manufacture 900, in accordance with some demonstrative embodiments. Product 900 may include one or more tangible computer readable ("machine-readable") non-transitory storage media 902, which may include computer executable instructions, e.g., implemented by logic 904, operable to, when executed by at least one computer processor, enable at least one computer processor to implement one or more operations at devices 102, 140, 160 and/or 180 (FIG. 1), radios 114 and/or 144 (FIG. 1), transmitters 118 and/or 148 (FIG. 1), receivers 116 and/or 146 (FIG. 1), controllers 124 and/or 154 (FIG. 1), message processors 128 and/or 158 (FIG. 1), positioning components 117 and/or 157 (FIG. 1), and/or location estimator 115 (FIG. 1), to cause devices 102, 140, 160 and/or 180 (FIG. 1), radios 114 and/or 144 (FIG. 1), transmitters 118 and/or 148 (FIG. 1), receivers 116 and/or 146 (FIG. 1), controllers 124 and/or 154 (FIG. 1), message processors 128 and/or 158 (FIG. 1), positioning components 117 and/or 157 (FIG. 1), and/or location estimator 115 (FIG. 1) to perform one or more operations, and/or to perform one or more operations described above with respect to FIGS. 1, 2, 3, 4, 5, 6, 7, and/or 8, and/or one or more operations described herein. The phrase "computer readable non-transitory storage media" is directed to include all computer-readable media, with the sole exception being a transitory propagating signal.

In some demonstrative embodiments, product 900 and/or storage media 902 may include one or more types of computer-readable storage media capable of storing data, including volatile memory, non-volatile memory, removable or non-removable memory, erasable or non-erasable memory, writeable or re-writeable memory, and the like. For example, storage media 902 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 904 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 904 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Examples

The following examples pertain to further embodiments.

Example 1 includes an apparatus comprising logic and circuitry configured to cause a wireless communication station to generate a plurality of sounding sequences corresponding to a plurality of stations (STAs), the plurality of sounding sequences comprising at least first and second different sounding sequences, the first sounding sequence corresponding to at least one first STA of the plurality of STAs, the second sounding sequence corresponding to at least one second STA of the plurality of STAs; during a Multi-User (MU) ranging measurement, transmit a MU frame to indicate a MU Downlink (DL) transmission; and following the MU frame, transmit a MU DL Null Data Packet (NDP) transmission to the plurality of STAs, the MU DL NDP transmission comprising a plurality of Long Training Fields (LTFs) comprising the plurality of sounding sequences.

Example 2 includes the subject matter of Example 1, and optionally, wherein the MU DL NDP transmission comprises a first DL NDP comprising a first plurality of LTFs comprising the first sounding sequence, and a second DL NDP comprising a second plurality of LTFs comprising the second sounding sequence.

Example 3 includes the subject matter of Example 1, and optionally, wherein the MU DL NDP transmission comprises a shared DL NDP to be shared by the first and second STAs, the shared DL NDP comprising one or more first LTFs comprising the first sounding sequence, and one or more second LTFs comprising the second sounding sequence.

Example 4 includes the subject matter of any one of Examples 1-3, and optionally, wherein the MU frame comprises allocation information to indicate an allocation of the plurality of LTFs to the plurality of STAs, the allocation information to indicate to a STA of the plurality of STAs, which one or more LTFs of the plurality of LTFs comprise a sounding sequence corresponding to the STA.

Example 5 includes the subject matter of any one of Examples 1-4, and optionally, wherein the plurality of sounding sequences comprises two or more individual sounding sequences corresponding to two or more respective STAs of the plurality of STAs.

Example 6 includes the subject matter of any one of Examples 1-5, and optionally, wherein the plurality of sounding sequences comprises at least one shared sounding sequence to be shared by two or more STAs of the plurality of STAs.

Example 7 includes the subject matter of any one of Examples 1-6, and optionally, wherein the apparatus is configured to cause the wireless communication station to transmit to at least one STA of the plurality of STAs sequence generation information to define a sounding sequence corresponding to the STA.

Example 8 includes the subject matter of any one of Examples 1-7, and optionally, wherein the apparatus is configured to cause the wireless communication station to receive from at least one STA of the plurality of STAs a feedback based on a measurement of a sounding sequence corresponding to the STA, and to determine a range measurement corresponding to the STA based on the feedback.

Example 9 includes the subject matter of any one of Examples 1-8, and optionally, wherein the apparatus is configured to cause the wireless communication station to determine the first training sequence based on a first random binary sequence, and to determine the second training sequence based on a second random binary sequence.

Example 10 includes the subject matter of any one of Examples 1-9, and optionally, wherein the apparatus is configured to cause the wireless communication station to dynamically change at least one of the first or second training sequences.

Example 11 includes the subject matter of any one of Examples 1-10, and optionally, wherein the MU frame comprises an NDP Announcement (NDPA) to announce the MU DL NDP transmission.

Example 12 includes the subject matter of any one of Examples 1-10, and optionally, wherein the MU frame comprises a MU trigger frame.

Example 13 includes the subject matter of any one of Examples 1-12, and optionally, wherein the plurality of LTFs comprises one or more of Very High Throughput (VHT) LTFs, or High Efficiency (HE) LTFs.

Example 14 includes the subject matter of any one of Examples 1-13, and optionally, wherein the plurality of training sequences comprises a plurality of binary sequences of "+1" and "−1".

Example 15 includes the subject matter of any one of Examples 1-14, and optionally, wherein the plurality of training sequences comprises a plurality of random sequences.

Example 16 includes the subject matter of any one of Examples 1-15, and optionally, wherein the MU DL NDP transmission is separated from the MU frame by a Short Inter-Frame-Space (SIFS).

Example 17 includes the subject matter of any one of Examples 1-16, and optionally, wherein the apparatus is configured to cause the wireless communication station to, following the MU DL NDP transmission, receive a MU Uplink (UL) transmission comprising a plurality of Location Measurement Reports (LMRs) from the plurality of STAs.

Example 18 includes the subject matter of any one of Examples 1-17, and optionally, wherein the wireless communication station comprises an Access Point (AP).

Example 19 includes the subject matter of any one of Examples 1-18, and optionally, comprising a radio to transmit the MU frame and the MU DL NDP transmission.

Example 20 includes the subject matter of any one of Examples 1-19, and optionally, comprising one or more antennas, a memory and a processor.

Example 21 includes a system of wireless communication comprising a wireless communication station, the wireless communication station comprising one or more antennas; a radio; a memory; a processor; and a controller configured to cause the wireless communication station to generate a plurality of sounding sequences corresponding to a plurality of stations (STAs), the plurality of sounding sequences comprising at least first and second different sounding sequences, the first sounding sequence corresponding to at least one first STA of the plurality of STAs, the second sounding sequence corresponding to at least one second STA of the plurality of STAs; during a Multi-User (MU) ranging measurement, transmit a MU frame to indicate a MU Downlink (DL) transmission; and following the MU frame, transmit a MU DL Null Data Packet (NDP) transmission to the plurality of STAs, the MU DL NDP transmission comprising a plurality of Long Training Fields (LTFs) comprising the plurality of sounding sequences.

Example 22 includes the subject matter of Example 21, and optionally, wherein the MU DL NDP transmission comprises a first DL NDP comprising a first plurality of LTFs comprising the first sounding sequence, and a second DL NDP comprising a second plurality of LTFs comprising the second sounding sequence.

Example 23 includes the subject matter of Example 21, and optionally, wherein the MU DL NDP transmission comprises a shared DL NDP to be shared by the first and second STAs, the shared DL NDP comprising one or more first LTFs comprising the first sounding sequence, and one or more second LTFs comprising the second sounding sequence.

Example 24 includes the subject matter of any one of Examples 21-23, and optionally, wherein the MU frame comprises allocation information to indicate an allocation of the plurality of LTFs to the plurality of STAs, the allocation information to indicate to a STA of the plurality of STAs, which one or more LTFs of the plurality of LTFs comprise a sounding sequence corresponding to the STA.

Example 25 includes the subject matter of any one of Examples 21-24, and optionally, wherein the plurality of sounding sequences comprises two or more individual sounding sequences corresponding to two or more respective STAs of the plurality of STAs.

Example 26 includes the subject matter of any one of Examples 21-25, and optionally, wherein the plurality of sounding sequences comprises at least one shared sounding sequence to be shared by two or more STAs of the plurality of STAs.

Example 27 includes the subject matter of any one of Examples 21-26, and optionally, wherein the controller is configured to cause the wireless communication station to transmit to at least one STA of the plurality of STAs sequence generation information to define a sounding sequence corresponding to the STA.

Example 28 includes the subject matter of any one of Examples 21-27, and optionally, wherein the controller is configured to cause the wireless communication station to receive from at least one STA of the plurality of STAs a feedback based on a measurement of a sounding sequence corresponding to the STA, and to determine a range measurement corresponding to the STA based on the feedback.

Example 29 includes the subject matter of any one of Examples 21-28, and optionally, wherein the controller is configured to cause the wireless communication station to determine the first training sequence based on a first random binary sequence, and to determine the second training sequence based on a second random binary sequence.

Example 30 includes the subject matter of any one of Examples 21-29, and optionally, wherein the controller is configured to cause the wireless communication station to dynamically change at least one of the first or second training sequences.

Example 31 includes the subject matter of any one of Examples 21-30, and optionally, wherein the MU frame comprises an NDP Announcement (NDPA) to announce the MU DL NDP transmission.

Example 32 includes the subject matter of any one of Examples 21-30, and optionally, wherein the MU frame comprises a MU trigger frame.

Example 33 includes the subject matter of any one of Examples 21-32, and optionally, wherein the plurality of LTFs comprises one or more of Very High Throughput (VHT) LTFs, or High Efficiency (HE) LTFs.

Example 34 includes the subject matter of any one of Examples 21-33, and optionally, wherein the plurality of training sequences comprises a plurality of binary sequences of "+1" and "−1".

Example 35 includes the subject matter of any one of Examples 21-34, and optionally, wherein the plurality of training sequences comprises a plurality of random sequences.

Example 36 includes the subject matter of any one of Examples 21-35, and optionally, wherein the MU DL NDP transmission is separated from the MU frame by a Short Inter-Frame-Space (SIFS).

Example 37 includes the subject matter of any one of Examples 21-36, and optionally, wherein the controller is configured to cause the wireless communication station to, following the MU DL NDP transmission, receive a MU Uplink (UL) transmission comprising a plurality of Location Measurement Reports (LMRs) from the plurality of STAs.

Example 38 includes the subject matter of any one of Examples 21-37, and optionally, wherein the wireless communication station comprises an Access Point (AP).

Example 39 includes a method to be performed at a wireless communication station, the method comprising generating a plurality of sounding sequences corresponding to a plurality of stations (STAs), the plurality of sounding sequences comprising at least first and second different sounding sequences, the first sounding sequence corresponding to at least one first STA of the plurality of STAs, the second sounding sequence corresponding to at least one second STA of the plurality of STAs; during a Multi-User (MU) ranging measurement, transmitting a MU frame to indicate a MU Downlink (DL) transmission; and following the MU frame, transmitting a MU DL Null Data Packet (NDP) transmission to the plurality of STAs, the MU DL NDP transmission comprising a plurality of Long Training Fields (LTFs) comprising the plurality of sounding sequences.

Example 40 includes the subject matter of Example 39, and optionally, wherein the MU DL NDP transmission comprises a first DL NDP comprising a first plurality of LTFs comprising the first sounding sequence, and a second DL NDP comprising a second plurality of LTFs comprising the second sounding sequence.

Example 41 includes the subject matter of Example 39, and optionally, wherein the MU DL NDP transmission comprises a shared DL NDP to be shared by the first and second STAs, the shared DL NDP comprising one or more first LTFs comprising the first sounding sequence, and one or more second LTFs comprising the second sounding sequence.

Example 42 includes the subject matter of any one of Examples 39-41, and optionally, wherein the MU frame comprises allocation information to indicate an allocation of the plurality of LTFs to the plurality of STAs, the allocation information to indicate to a STA of the plurality of STAs, which one or more LTFs of the plurality of LTFs comprise a sounding sequence corresponding to the STA.

Example 43 includes the subject matter of any one of Examples 39-42, and optionally, wherein the plurality of sounding sequences comprises two or more individual sounding sequences corresponding to two or more respective STAs of the plurality of STAs.

Example 44 includes the subject matter of any one of Examples 39-43, and optionally, wherein the plurality of sounding sequences comprises at least one shared sounding sequence to be shared by two or more STAs of the plurality of STAs.

Example 45 includes the subject matter of any one of Examples 39-44, and optionally, comprising transmitting to at least one STA of the plurality of STAs sequence generation information to define a sounding sequence corresponding to the STA.

Example 46 includes the subject matter of any one of Examples 39-45, and optionally, comprising receiving from at least one STA of the plurality of STAs a feedback based on a measurement of a sounding sequence corresponding to the STA, and determining a range measurement corresponding to the STA based on the feedback.

Example 47 includes the subject matter of any one of Examples 39-46, and optionally, comprising determining the first training sequence based on a first random binary sequence, and determining the second training sequence based on a second random binary sequence.

Example 48 includes the subject matter of any one of Examples 39-47, and optionally, comprising dynamically changing at least one of the first or second training sequences.

Example 49 includes the subject matter of any one of Examples 39-48, and optionally, wherein the MU frame comprises an NDP Announcement (NDPA) to announce the MU DL NDP transmission.

Example 50 includes the subject matter of any one of Examples 39-48, and optionally, wherein the MU frame comprises a MU trigger frame.

Example 51 includes the subject matter of any one of Examples 39-50, and optionally, wherein the plurality of LTFs comprises one or more of Very High Throughput (VHT) LTFs, or High Efficiency (HE) LTFs.

Example 52 includes the subject matter of any one of Examples 39-51, and optionally, wherein the plurality of training sequences comprises a plurality of binary sequences of "+1" and "−1".

Example 53 includes the subject matter of any one of Examples 39-52, and optionally, wherein the plurality of training sequences comprises a plurality of random sequences.

Example 54 includes the subject matter of any one of Examples 39-53, and optionally, wherein the MU DL NDP transmission is separated from the MU frame by a Short Inter-Frame-Space (SIFS).

Example 55 includes the subject matter of any one of Examples 39-54, and optionally, comprising, following the MU DL NDP transmission, receiving a MU Uplink (UL) transmission comprising a plurality of Location Measurement Reports (LMRs) from the plurality of STAs.

Example 56 includes the subject matter of any one of Examples 39-55, and optionally, wherein the wireless communication station comprises an Access Point (AP).

Example 57 includes a product including one or more tangible computer-readable non-transitory storage media comprising computer-executable instructions operable to, when executed by at least one processor, enable the at least one processor to cause a wireless communication station to generate a plurality of sounding sequences corresponding to a plurality of stations (STAs), the plurality of sounding sequences comprising at least first and second different sounding sequences, the first sounding sequence corresponding to at least one first STA of the plurality of STAs, the second sounding sequence corresponding to at least one second STA of the plurality of STAs; during a Multi-User (MU) ranging measurement, transmit a MU frame to indicate a MU Downlink (DL) transmission; and following the MU frame, transmit a MU DL Null Data Packet (NDP) transmission to the plurality of STAs, the MU DL NDP transmission comprising a plurality of Long Training Fields (LTFs) comprising the plurality of sounding sequences.

Example 58 includes the subject matter of Example 57, and optionally, wherein the MU DL NDP transmission comprises a first DL NDP comprising a first plurality of LTFs comprising the first sounding sequence, and a second DL NDP comprising a second plurality of LTFs comprising the second sounding sequence.

Example 59 includes the subject matter of Example 57, and optionally, wherein the MU DL NDP transmission comprises a shared DL NDP to be shared by the first and second STAs, the shared DL NDP comprising one or more first LTFs comprising the first sounding sequence, and one or more second LTFs comprising the second sounding sequence.

Example 60 includes the subject matter of any one of Examples 57-59, and optionally, wherein the MU frame comprises allocation information to indicate an allocation of the plurality of LTFs to the plurality of STAs, the allocation information to indicate to a STA of the plurality of STAs, which one or more LTFs of the plurality of LTFs comprise a sounding sequence corresponding to the STA.

Example 61 includes the subject matter of any one of Examples 57-60, and optionally, wherein the plurality of sounding sequences comprises two or more individual sounding sequences corresponding to two or more respective STAs of the plurality of STAs.

Example 62 includes the subject matter of any one of Examples 57-61, and optionally, wherein the plurality of sounding sequences comprises at least one shared sounding sequence to be shared by two or more STAs of the plurality of STAs.

Example 63 includes the subject matter of any one of Examples 57-62, and optionally, wherein the instructions, when executed, cause the wireless communication station to transmit to at least one STA of the plurality of STAs sequence generation information to define a sounding sequence corresponding to the STA.

Example 64 includes the subject matter of any one of Examples 57-63, and optionally, wherein the instructions, when executed, cause the wireless communication station to receive from at least one STA of the plurality of STAs a feedback based on a measurement of a sounding sequence corresponding to the STA, and to determine a range measurement corresponding to the STA based on the feedback.

Example 65 includes the subject matter of any one of Examples 57-64, and optionally, wherein the instructions, when executed, cause the wireless communication station to determine the first training sequence based on a first random binary sequence, and to determine the second training sequence based on a second random binary sequence.

Example 66 includes the subject matter of any one of Examples 57-65, and optionally, wherein the instructions, when executed, cause the wireless communication station to dynamically change at least one of the first or second training sequences.

Example 67 includes the subject matter of any one of Examples 57-66, and optionally, wherein the MU frame comprises an NDP Announcement (NDPA) to announce the MU DL NDP transmission.

Example 68 includes the subject matter of any one of Examples 57-66, and optionally, wherein the MU frame comprises a MU trigger frame.

Example 69 includes the subject matter of any one of Examples 57-68, and optionally, wherein the plurality of LTFs comprises one or more of Very High Throughput (VHT) LTFs, or High Efficiency (HE) LTFs.

Example 70 includes the subject matter of any one of Examples 57-69, and optionally, wherein the plurality of training sequences comprises a plurality of binary sequences of "+1" and "−1".

Example 71 includes the subject matter of any one of Examples 57-70, and optionally, wherein the plurality of training sequences comprises a plurality of random sequences.

Example 72 includes the subject matter of any one of Examples 57-71, and optionally, wherein the MU DL NDP transmission is separated from the MU frame by a Short Inter-Frame-Space (SIFS).

Example 73 includes the subject matter of any one of Examples 57-72, and optionally, wherein the instructions, when executed, cause the wireless communication station to, following the MU DL NDP transmission, receive a MU Uplink (UL) transmission comprising a plurality of Location Measurement Reports (LMRs) from the plurality of STAs.

Example 74 includes the subject matter of any one of Examples 57-73, and optionally, wherein the wireless communication station comprises an Access Point (AP).

Example 75 includes an apparatus of wireless communication by a wireless communication station, the apparatus comprising means for generating a plurality of sounding sequences corresponding to a plurality of stations (STAs), the plurality of sounding sequences comprising at least first and second different sounding sequences, the first sounding sequence corresponding to at least one first STA of the plurality of STAs, the second sounding sequence corresponding to at least one second STA of the plurality of STAs; means for, during a Multi-User (MU) ranging measurement, transmitting a MU frame to indicate a MU Downlink (DL) transmission; and means for, following the MU frame, transmitting a MU DL Null Data Packet (NDP) transmission to the plurality of STAs, the MU DL NDP transmission comprising a plurality of Long Training Fields (LTFs) comprising the plurality of sounding sequences.

Example 76 includes the subject matter of Example 75, and optionally, wherein the MU DL NDP transmission comprises a first DL NDP comprising a first plurality of LTFs comprising the first sounding sequence, and a second DL NDP comprising a second plurality of LTFs comprising the second sounding sequence.

Example 77 includes the subject matter of Example 75, and optionally, wherein the MU DL NDP transmission comprises a shared DL NDP to be shared by the first and second STAs, the shared DL NDP comprising one or more first LTFs comprising the first sounding sequence, and one or more second LTFs comprising the second sounding sequence.

Example 78 includes the subject matter of any one of Examples 75-77, and optionally, wherein the MU frame comprises allocation information to indicate an allocation of the plurality of LTFs to the plurality of STAs, the allocation information to indicate to a STA of the plurality of STAs, which one or more LTFs of the plurality of LTFs comprise a sounding sequence corresponding to the STA.

Example 79 includes the subject matter of any one of Examples 75-78, and optionally, wherein the plurality of sounding sequences comprises two or more individual sounding sequences corresponding to two or more respective STAs of the plurality of STAs.

Example 80 includes the subject matter of any one of Examples 75-79, and optionally, wherein the plurality of sounding sequences comprises at least one shared sounding sequence to be shared by two or more STAs of the plurality of STAs.

Example 81 includes the subject matter of any one of Examples 75-80, and optionally, comprising means for transmitting to at least one STA of the plurality of STAs sequence generation information to define a sounding sequence corresponding to the STA.

Example 82 includes the subject matter of any one of Examples 75-81, and optionally, comprising means for receiving from at least one STA of the plurality of STAs a feedback based on a measurement of a sounding sequence corresponding to the STA, and determining a range measurement corresponding to the STA based on the feedback.

Example 83 includes the subject matter of any one of Examples 75-82, and optionally, comprising means for determining the first training sequence based on a first random binary sequence, and determining the second training sequence based on a second random binary sequence.

Example 84 includes the subject matter of any one of Examples 75-83, and optionally, comprising means for dynamically changing at least one of the first or second training sequences.

Example 85 includes the subject matter of any one of Examples 75-84, and optionally, wherein the MU frame comprises an NDP Announcement (NDPA) to announce the MU DL NDP transmission.

Example 86 includes the subject matter of any one of Examples 75-84, and optionally, wherein the MU frame comprises a MU trigger frame.

Example 87 includes the subject matter of any one of Examples 75-86, and optionally, wherein the plurality of LTFs comprises one or more of Very High Throughput (VHT) LTFs, or High Efficiency (HE) LTFs.

Example 88 includes the subject matter of any one of Examples 75-87, and optionally, wherein the plurality of training sequences comprises a plurality of binary sequences of "+1" and "−1".

Example 89 includes the subject matter of any one of Examples 75-88, and optionally, wherein the plurality of training sequences comprises a plurality of random sequences.

Example 90 includes the subject matter of any one of Examples 75-89, and optionally, wherein the MU DL NDP transmission is separated from the MU frame by a Short Inter-Frame-Space (SIFS).

Example 91 includes the subject matter of any one of Examples 75-90, and optionally, comprising means for, following the MU DL NDP transmission, receiving a MU Uplink (UL) transmission comprising a plurality of Location Measurement Reports (LMRs) from the plurality of STAs.

Example 92 includes the subject matter of any one of Examples 75-91, and optionally, wherein the wireless communication station comprises an Access Point (AP).

Example 93 includes an apparatus comprising circuitry and logic configured to cause a first wireless station (STA) to during a Multi-User (MU) ranging measurement, receive a MU frame from a second STA to indicate a MU Downlink (DL) transmission, the MU frame comprises allocation information to indicate an allocation of a plurality of Long Training Fields (LTFs) to a plurality of STAs including the first STA, the allocation information to indicate which one or more LTFs of the plurality of LTFs comprises a sounding sequence corresponding to the first STA; following the MU frame, receive a MU DL Null Data Packet (NDP) transmission comprising the plurality of LTFs; and based on the allocation information, determine one or more measurements on the one or more LTFs comprising the sounding sequence corresponding to the first STA.

Example 94 includes the subject matter of Example 93, and optionally, wherein the MU DL NDP transmission comprises a plurality of DL NDPs, the allocation information to indicate which DL NDP of the plurality of DL NDPs comprises the one or more LTFs comprising the sounding sequence corresponding to the first STA.

Example 95 includes the subject matter of Example 94, and optionally, wherein the allocation information is to indicate which one or more LTFs in the DL NDP comprise the one or more LTFs comprising the sounding sequence corresponding to the first STA.

Example 96 includes the subject matter of any one of Examples 93-95, and optionally, wherein the sounding sequence corresponding to the first STA comprises an individual sounding sequence individually assigned to the first STA.

Example 97 includes the subject matter of any one of Examples 93-95, and optionally, wherein the sounding sequence corresponding to the first STA comprises a shared sounding sequence to be shared by the first STA and at least one other STA of the plurality of STAs.

Example 98 includes the subject matter of any one of Examples 93-97, and optionally, wherein the apparatus is configured to cause the first STA to receive from the second STA sequence generation information to define the sounding sequence corresponding to the first STA, and to determine the one or more measurements based on the sequence generation information.

Example 99 includes the subject matter of any one of Examples 93-98, and optionally, wherein the apparatus is configured to cause the first STA to transmit to the second STA a feedback based on the one or more measurements.

Example 100 includes the subject matter of any one of Examples 93-99, and optionally, wherein the sounding sequence corresponding to the first STA is based on a random binary sequence.

Example 101 includes the subject matter of any one of Examples 93-100, and optionally, wherein the sounding sequence corresponding to the first STA dynamically changes.

Example 102 includes the subject matter of any one of Examples 93-101, and optionally, wherein the MU frame comprises an NDP Announcement (NDPA) to announce the MU DL NDP transmission.

Example 103 includes the subject matter of any one of Examples 93-101, and optionally, wherein the MU frame comprises a MU trigger frame.

Example 104 includes the subject matter of any one of Examples 93-103, and optionally, wherein the plurality of LTFs comprises one or more of Very High Throughput (VHT) LTFs, or High Efficiency (HE) LTFs.

Example 105 includes the subject matter of any one of Examples 93-104, and optionally, wherein the sounding sequence corresponding to the first STA comprises a binary sequence of "+1" and "−1".

Example 106 includes the subject matter of any one of Examples 93-105, and optionally, wherein the sounding sequence corresponding to the first STA comprises a random sequence.

Example 107 includes the subject matter of any one of Examples 93-106, and optionally, wherein the MU DL NDP transmission is separated from the MU frame by a Short Inter-Frame-Space (SIFS).

Example 108 includes the subject matter of any one of Examples 93-107, and optionally, wherein the apparatus is configured to cause the first STA to, following the MU DL NDP transmission, transmit to the second STA a Location Measurement Report (LMR) as part of a MU Uplink (UL) transmission.

Example 109 includes the subject matter of any one of Examples 93-108, and optionally, comprising a radio to receive the MU frame and the MU DL NDP transmission.

Example 110 includes the subject matter of any one of Examples 93-109, and optionally, comprising one or more antennas, a memory and a processor.

Example 111 includes a system of wireless communication comprising a first wireless station (STA), the first STA comprising one or more antennas; a radio; a memory; a processor; and a controller configured to cause the first STA to during a Multi-User (MU) ranging measurement, receive a MU frame from a second STA to indicate a MU Downlink (DL) transmission, the MU frame comprises allocation information to indicate an allocation of a plurality of Long Training Fields (LTFs) to a plurality of STAs including the first STA, the allocation information to indicate which one or more LTFs of the plurality of LTFs comprises a sounding sequence corresponding to the first STA; following the MU frame, receive a MU DL Null Data Packet (NDP) transmission comprising the plurality of LTFs; and based on the allocation information, determine one or more measurements on the one or more LTFs comprising the sounding sequence corresponding to the first STA.

Example 112 includes the subject matter of Example 111, and optionally, wherein the MU DL NDP transmission comprises a plurality of DL NDPs, the allocation information to indicate which DL NDP of the plurality of DL NDPs comprises the one or more LTFs comprising the sounding sequence corresponding to the first STA.

Example 113 includes the subject matter of Example 112, and optionally, wherein the allocation information is to indicate which one or more LTFs in the DL NDP comprise the one or more LTFs comprising the sounding sequence corresponding to the first STA.

Example 114 includes the subject matter of any one of Examples 111-113, and optionally, wherein the sounding sequence corresponding to the first STA comprises an individual sounding sequence individually assigned to the first STA.

Example 115 includes the subject matter of any one of Examples 111-113, and optionally, wherein the sounding sequence corresponding to the first STA comprises a shared sounding sequence to be shared by the first STA and at least one other STA of the plurality of STAs.

Example 116 includes the subject matter of any one of Examples 111-115, and optionally, wherein the controller is configured to cause the first STA to receive from the second STA sequence generation information to define the sounding sequence corresponding to the first STA, and to determine the one or more measurements based on the sequence generation information.

Example 117 includes the subject matter of any one of Examples 111-116, and optionally, wherein the controller is configured to cause the first STA to transmit to the second STA a feedback based on the one or more measurements.

Example 118 includes the subject matter of any one of Examples 111-117, and optionally, wherein the sounding sequence corresponding to the first STA is based on a random binary sequence.

Example 119 includes the subject matter of any one of Examples 111-118, and optionally, wherein the sounding sequence corresponding to the first STA dynamically changes.

Example 120 includes the subject matter of any one of Examples 111-119, and optionally, wherein the MU frame comprises an NDP Announcement (NDPA) to announce the MU DL NDP transmission.

Example 121 includes the subject matter of any one of Examples 111-119, and optionally, wherein the MU frame comprises a MU trigger frame.

Example 122 includes the subject matter of any one of Examples 111-121, and optionally, wherein the plurality of LTFs comprises one or more of Very High Throughput (VHT) LTFs, or High Efficiency (HE) LTFs.

Example 123 includes the subject matter of any one of Examples 111-122, and optionally, wherein the sounding sequence corresponding to the first STA comprises a binary sequence of "+1" and "−1".

Example 124 includes the subject matter of any one of Examples 111-123, and optionally, wherein the sounding sequence corresponding to the first STA comprises a random sequence.

Example 125 includes the subject matter of any one of Examples 111-124, and optionally, wherein the MU DL NDP transmission is separated from the MU frame by a Short Inter-Frame-Space (SIFS).

Example 126 includes the subject matter of any one of Examples 111-125, and optionally, wherein the controller is configured to cause the first STA to, following the MU DL NDP transmission, transmit to the second STA a Location Measurement Report (LMR) as part of a MU Uplink (UL) transmission.

Example 127 includes a method to be performed at a first wireless communication station (STA), the method comprising during a Multi-User (MU) ranging measurement, receiving a MU frame from a second STA to indicate a MU Downlink (DL) transmission, the MU frame comprises allocation information to indicate an allocation of a plurality of Long Training Fields (LTFs) to a plurality of STAs including the first STA, the allocation information to indicate which one or more LTFs of the plurality of LTFs comprises a sounding sequence corresponding to the first STA; following the MU frame, receiving a MU DL Null Data Packet (NDP) transmission comprising the plurality of LTFs; and based on the allocation information, determining one or more measurements on the one or more LTFs comprising the sounding sequence corresponding to the first STA.

Example 128 includes the subject matter of Example 127, and optionally, wherein the MU DL NDP transmission comprises a plurality of DL NDPs, the allocation information to indicate which DL NDP of the plurality of DL NDPs comprises the one or more LTFs comprising the sounding sequence corresponding to the first STA.

Example 129 includes the subject matter of Example 128, and optionally, wherein the allocation information is to indicate which one or more LTFs in the DL NDP comprise the one or more LTFs comprising the sounding sequence corresponding to the first STA.

Example 130 includes the subject matter of any one of Examples 127-129, and optionally, wherein the sounding sequence corresponding to the first STA comprises an individual sounding sequence individually assigned to the first STA.

Example 131 includes the subject matter of any one of Examples 127-129, and optionally, wherein the sounding sequence corresponding to the first STA comprises a shared sounding sequence to be shared by the first STA and at least one other STA of the plurality of STAs.

Example 132 includes the subject matter of any one of Examples 127-131, and optionally, comprising receiving from the second STA sequence generation information to define the sounding sequence corresponding to the first STA, and determining the one or more measurements based on the sequence generation information.

Example 133 includes the subject matter of any one of Examples 127-132, and optionally, comprising transmitting to the second STA a feedback based on the one or more measurements.

Example 134 includes the subject matter of any one of Examples 127-133, and optionally, wherein the sounding sequence corresponding to the first STA is based on a random binary sequence.

Example 135 includes the subject matter of any one of Examples 127-134, and optionally, wherein the sounding sequence corresponding to the first STA dynamically changes.

Example 136 includes the subject matter of any one of Examples 127-135, and optionally, wherein the MU frame comprises an NDP Announcement (NDPA) to announce the MU DL NDP transmission.

Example 137 includes the subject matter of any one of Examples 127-135, and optionally, wherein the MU frame comprises a MU trigger frame.

Example 138 includes the subject matter of any one of Examples 127-137, and optionally, wherein the plurality of LTFs comprises one or more of Very High Throughput (VHT) LTFs, or High Efficiency (HE) LTFs.

Example 139 includes the subject matter of any one of Examples 127-138, and optionally, wherein the sounding sequence corresponding to the first STA comprises a binary sequence of "+1" and "−1".

Example 140 includes the subject matter of any one of Examples 127-139, and optionally, wherein the sounding sequence corresponding to the first STA comprises a random sequence.

Example 141 includes the subject matter of any one of Examples 127-140, and optionally, wherein the MU DL NDP transmission is separated from the MU frame by a Short Inter-Frame-Space (SIFS).

Example 142 includes the subject matter of any one of Examples 127-141, and optionally, comprising, following the MU DL NDP transmission, transmitting to the second STA a Location Measurement Report (LMR) as part of a MU Uplink (UL) transmission.

Example 143 includes a product including one or more tangible computer-readable non-transitory storage media comprising computer-executable instructions operable to, when executed by at least one processor, enable the at least one processor to cause a first wireless communication station (STA) to during a Multi-User (MU) ranging measurement, receive a MU frame from a second STA to indicate a MU Downlink (DL) transmission, the MU frame comprises allocation information to indicate an allocation of a plurality of Long Training Fields (LTFs) to a plurality of STAs including the first STA, the allocation information to indicate which one or more LTFs of the plurality of LTFs comprises a sounding sequence corresponding to the first STA; following the MU frame, receive a MU DL Null Data Packet (NDP) transmission comprising the plurality of LTFs; and based on the allocation information, determine one or more measurements on the one or more LTFs comprising the sounding sequence corresponding to the first STA.

Example 144 includes the subject matter of Example 143, and optionally, wherein the MU DL NDP transmission comprises a plurality of DL NDPs, the allocation information to indicate which DL NDP of the plurality of DL NDPs comprises the one or more LTFs comprising the sounding sequence corresponding to the first STA.

Example 145 includes the subject matter of Example 144, and optionally, wherein the allocation information is to indicate which one or more LTFs in the DL NDP comprise the one or more LTFs comprising the sounding sequence corresponding to the first STA.

Example 146 includes the subject matter of any one of Examples 143-145, and optionally, wherein the sounding sequence corresponding to the first STA comprises an individual sounding sequence individually assigned to the first STA.

Example 147 includes the subject matter of any one of Examples 143-145, and optionally, wherein the sounding sequence corresponding to the first STA comprises a shared sounding sequence to be shared by the first STA and at least one other STA of the plurality of STAs.

Example 148 includes the subject matter of any one of Examples 143-147, and optionally, wherein the instructions, when executed, cause the first STA to receive from the second STA sequence generation information to define the sounding sequence corresponding to the first STA, and to determine the one or more measurements based on the sequence generation information.

Example 149 includes the subject matter of any one of Examples 143-148, and optionally, wherein the instructions, when executed, cause the first STA to transmit to the second STA a feedback based on the one or more measurements.

Example 150 includes the subject matter of any one of Examples 143-149, and optionally, wherein the sounding sequence corresponding to the first STA is based on a random binary sequence.

Example 151 includes the subject matter of any one of Examples 143-150, and optionally, wherein the sounding sequence corresponding to the first STA dynamically changes.

Example 152 includes the subject matter of any one of Examples 143-151, and optionally, wherein the MU frame comprises an NDP Announcement (NDPA) to announce the MU DL NDP transmission.

Example 153 includes the subject matter of any one of Examples 143-151, and optionally, wherein the MU frame comprises a MU trigger frame.

Example 154 includes the subject matter of any one of Examples 143-153, and optionally, wherein the plurality of LTFs comprises one or more of Very High Throughput (VHT) LTFs, or High Efficiency (HE) LTFs.

Example 155 includes the subject matter of any one of Examples 143-154, and optionally, wherein the sounding sequence corresponding to the first STA comprises a binary sequence of "+1" and "−1".

Example 156 includes the subject matter of any one of Examples 143-155, and optionally, wherein the sounding sequence corresponding to the first STA comprises a random sequence.

Example 157 includes the subject matter of any one of Examples 143-156, and optionally, wherein the MU DL NDP transmission is separated from the MU frame by a Short Inter-Frame-Space (SIFS).

Example 158 includes the subject matter of any one of Examples 143-157, and optionally, wherein the instructions, when executed, cause the first STA to, following the MU DL NDP transmission, transmit to the second STA a Location Measurement Report (LMR) as part of a MU Uplink (UL) transmission.

Example 159 includes an apparatus of wireless communication by a first wireless communication station (STA), the first STA comprising means for, during a Multi-User (MU) ranging measurement, receiving a MU frame from a second STA to indicate a MU Downlink (DL) transmission, the MU frame comprises allocation information to indicate an allocation of a plurality of Long Training Fields (LTFs) to a plurality of STAs including the first STA, the allocation information to indicate which one or more LTFs of the plurality of LTFs comprises a sounding sequence corresponding to the first STA; means for, following the MU frame, receiving a MU DL Null Data Packet (NDP) transmission comprising the plurality of LTFs; and means for, based on the allocation information, determining one or more measurements on the one or more LTFs comprising the sounding sequence corresponding to the first STA.

Example 160 includes the subject matter of Example 159, and optionally, wherein the MU DL NDP transmission comprises a plurality of DL NDPs, the allocation information to indicate which DL NDP of the plurality of DL NDPs comprises the one or more LTFs comprising the sounding sequence corresponding to the first STA.

Example 161 includes the subject matter of Example 160, and optionally, wherein the allocation information is to indicate which one or more LTFs in the DL NDP comprise the one or more LTFs comprising the sounding sequence corresponding to the first STA.

Example 162 includes the subject matter of any one of Examples 159-161, and optionally, wherein the sounding sequence corresponding to the first STA comprises an individual sounding sequence individually assigned to the first STA.

Example 163 includes the subject matter of any one of Examples 159-161, and optionally, wherein the sounding sequence corresponding to the first STA comprises a shared sounding sequence to be shared by the first STA and at least one other STA of the plurality of STAs.

Example 164 includes the subject matter of any one of Examples 159-163, and optionally, comprising means for receiving from the second STA sequence generation information to define the sounding sequence corresponding to the first STA, and determining the one or more measurements based on the sequence generation information.

Example 165 includes the subject matter of any one of Examples 159-164 transmit comprising means for transmitting to the second STA a feedback based on the one or more measurements.

Example 166 includes the subject matter of any one of Examples 159-165, and optionally, wherein the sounding sequence corresponding to the first STA is based on a random binary sequence.

Example 167 includes the subject matter of any one of Examples 159-166, and optionally, wherein the sounding sequence corresponding to the first STA dynamically changes.

Example 168 includes the subject matter of any one of Examples 159-167, and optionally, wherein the MU frame comprises an NDP Announcement (NDPA) to announce the MU DL NDP transmission.

Example 169 includes the subject matter of any one of Examples 159-167, and optionally, wherein the MU frame comprises a MU trigger frame.

Example 170 includes the subject matter of any one of Examples 159-169, and optionally, wherein the plurality of LTFs comprises one or more of Very High Throughput (VHT) LTFs, or High Efficiency (HE) LTFs.

Example 171 includes the subject matter of any one of Examples 159-170, and optionally, wherein the sounding sequence corresponding to the first STA comprises a binary sequence of "+1" and "−1".

Example 172 includes the subject matter of any one of Examples 159-171, and optionally, wherein the sounding sequence corresponding to the first STA comprises a random sequence.

Example 173 includes the subject matter of any one of Examples 159-172, and optionally, wherein the MU DL NDP transmission is separated from the MU frame by a Short Inter-Frame-Space (SIFS).

Example 174 includes the subject matter of any one of Examples 159-173, and optionally, comprising means for, following the MU DL NDP transmission, transmitting to the second STA a Location Measurement Report (LMR) as part of a MU Uplink (UL) transmission.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
memory circuitry; and
a processor comprising logic and circuitry configured to cause a responder wireless communication station (STA) to:
transmit first secure sequence generation information to a first initiator STA;
transmit second secure sequence generation information to a second initiator STA;
transmit a trigger frame (TF);
process a plurality of Null Data Packets (NDPs) from a plurality of initiator STAs after the TF, the plurality of initiator STAs comprising the first initiator STA and the second initiator STA;
transmit an NDP Announcement (NDPA) a first Short Inter-Frame Space (SIFS) after the plurality of NDPs, wherein the NDPA is during a sounding part of a ranging measurement with the plurality of initiator STAs; and
transmit an NDP a second SIFS after the NDPA, the NDP comprising a plurality of High Efficiency (HE) Long Training Field (LTF) (HE-LTF) symbols, the plurality of HE-LTF symbols comprising a first secure HE-LTF symbol for the first initiator STA and a second secure HE-LTF symbol for the second initiator STA, the first secure HE-LTF symbol comprising a first randomized LTF sequence which is based on the first secure sequence generation information, the second secure HE-LTF symbol comprising a second randomized LTF sequence which is based on the second secure sequence generation information.

2. The apparatus of claim 1 configured to cause the responder STA to generate a pseudo-random protection sequence based on the first secure sequence generation information, and to generate the first randomized LTF sequence based on the pseudo-random protection sequence.

3. The apparatus of claim 1, wherein the NDPA comprises first allocation information for the first initiator STA, and second allocation information for the second initiator STA, the first allocation information to indicate to the first initiator STA an allocation of the first secure HE-LTF symbol in the plurality of HE-LTF symbols, the second allocation information to indicate to the second initiator STA an allocation of the second secure HE-LTF symbol in the plurality of HE-LTF symbols.

4. The apparatus of claim 1, wherein the NDPA comprises allocation information to indicate to the first initiator STA an allocation of the first secure HE-LTF symbol in the plurality of HE-LTF symbols.

5. The apparatus of claim 1 configured to cause the responder STA to transmit the first secure sequence generation information to the first initiator STA in a negotiation prior to the ranging measurement.

6. The apparatus of claim 1 comprising a radio, the processor configured to cause the radio to transmit the NDPA and the NDP.

7. The apparatus of claim 6 comprising one or more antennas connected to the radio, another memory to store data processed by the responder STA, and another processor to execute instructions of an operating system.

8. A product comprising one or more tangible computer-readable non-transitory storage media comprising computer-executable instructions configured to, when executed by at least one processor, enable the at least one processor to cause a responder wireless communication station (STA) to:
transmit first secure sequence generation information to a first initiator STA;
transmit second secure sequence generation information to a second initiator STA;
transmit a trigger frame (TF);
process a plurality of Null Data Packets (NDPs) from a plurality of initiator STAs after the TF, the plurality of initiator STAs comprising the first initiator STA and the second initiator STA;
transmit an NDP Announcement (NDPA) a first Short Inter-Frame Space (SIFS) after the plurality of NDPs, wherein the NDPA is during a sounding part of a ranging measurement with the plurality of initiator STAs; and
transmit an NDP a second SIFS after the NDPA, the NDP comprising a plurality of High Efficiency (HE) Long Training Field (LTF) (HE-LTF) symbols, the plurality of HE-LTF symbols comprising a first secure HE-LTF symbol for the first initiator STA and a second secure HE-LTF symbol for the second initiator STA, the first secure HE-LTF symbol comprising a first randomized LTF sequence which is based on the first secure sequence generation information, the second secure HE-LTF symbol comprising a second randomized LTF sequence which is based on the second secure sequence generation information.

9. The product of claim 8, wherein the instructions, when executed, cause the responder STA to generate a pseudo-random protection sequence based on the first secure sequence generation information, and to generate the first randomized LTF sequence based on the pseudo-random protection sequence.

10. The product of claim 8, wherein the NDPA comprises first allocation information for the first initiator STA, and second allocation information for the second initiator STA, the first allocation information to indicate to the first initiator STA an allocation of the first secure HE-LTF symbol in the plurality of HE-LTF symbols, the second allocation information to indicate to the second initiator STA an allocation of the second secure HE-LTF symbol in the plurality of HE-LTF symbols.

11. The product of claim 8, wherein the NDPA comprises allocation information to indicate to the first initiator STA an allocation of the first secure HE-LTF symbol in the plurality of HE-LTF symbols.

12. The product of claim 8, wherein the instructions, when executed, cause the responder STA to transmit the first secure sequence generation information to the first initiator STA in a negotiation prior to the ranging measurement.

13. An apparatus comprising:
means for causing a responder wireless communication station (STA) to transmit first secure sequence generation information to a first initiator STA;
means for causing the responder STA to transmit second secure sequence generation information to a second initiator STA;
means for causing the responder STA to transmit a trigger frame (TF);
means for causing the responder STA to process a plurality of Null Data Packets (NDPs) from a plurality of initiator STAs after the TF, the plurality of initiator STAs comprising the first initiator STA and the second initiator STA;
means for causing the responder STA to transmit an NDP Announcement (NDPA) a first Short Inter-Frame Space (SIFS) after the plurality of NDPs, wherein the NDPA is during a sounding part of a ranging measurement with the plurality of initiator STAs; and means for causing the responder STA to transmit an NDP a second SIFS after the NDPA, the NDP comprising a plurality of High Efficiency (HE) Long Training Field (LTF) (HE-LTF) symbols, the plurality of HE-LTF symbols comprising a first secure HE-LTF symbol for the first initiator STA and a second secure HE-LTF symbol for the second initiator STA, the first secure HE-LTF symbol comprising a first randomized LTF sequence which is based on the first secure sequence generation information, the second secure HE-LTF symbol comprising a second randomized LTF sequence which is based on the second secure sequence generation information.

14. The apparatus of claim 13 comprising means for causing the responder STA to generate a pseudo-random protection sequence based on the first secure sequence generation information, and to generate the first randomized LTF sequence based on the pseudo-random protection sequence.

15. The apparatus of claim 13 comprising means for causing the responder STA to transmit the first secure sequence generation information to the first initiator STA in a negotiation prior to the ranging measurement.

16. The apparatus of claim 13, wherein the NDPA comprises first allocation information for the first initiator STA, and second allocation information for the second initiator STA, the first allocation information to indicate to the first initiator STA an allocation of the first secure HE-LTF symbol in the plurality of HE-LTF symbols, the second allocation information to indicate to the second initiator STA an allocation of the second secure HE-LTF symbol in the plurality of HE-LTF symbols.

\* \* \* \* \*